(12) United States Patent
Kurasawa et al.

(10) Patent No.: US 10,920,639 B2
(45) Date of Patent: Feb. 16, 2021

(54) SADDLE RIDING VEHICLE

(71) Applicant: HONDA MOTOR CO., LTD., Tokyo (JP)

(72) Inventors: Yuji Kurasawa, Wako (JP); Keita Sakurada, Wako (JP); Shuji Iimura, Wako (JP); Toshihiro Kubo, Wako (JP); Satoru Maki, Wako (JP); Takahiko Shimizu, Wako (JP)

(73) Assignee: Honda Motor Co., Ltd., Tokyo (JP)

( * ) Notice: Subject to any disclaimer, the term of this patent is extended or adjusted under 35 U.S.C. 154(b) by 0 days.

(21) Appl. No.: 16/498,785

(22) PCT Filed: Feb. 9, 2018

(86) PCT No.: PCT/JP2018/004748
§ 371 (c)(1),
(2) Date: Sep. 27, 2019

(87) PCT Pub. No.: WO2018/179915
PCT Pub. Date: Oct. 4, 2018

(65) Prior Publication Data
US 2020/0318517 A1    Oct. 8, 2020

(30) Foreign Application Priority Data

Mar. 29, 2017  (JP) ................................ 2017-065112
Mar. 30, 2017  (JP) ................................ 2017-067967

(51) Int. Cl.
*F01N 3/24*   (2006.01)
*B62M 7/02*   (2006.01)
(Continued)

(52) U.S. Cl.
CPC ................. *F01N 3/24* (2013.01); *B62M 7/02* (2013.01); *B62M 7/06* (2013.01); *F01N 13/08* (2013.01); *B62K 2202/00* (2013.01)

(58) Field of Classification Search
CPC . F01N 3/24; F01N 13/08; B62M 7/02; B62M 7/06; B62K 2202/00
See application file for complete search history.

(56) References Cited

FOREIGN PATENT DOCUMENTS

EP    2075424 A1    7/2009
EP    3498996 A1    6/2019
(Continued)

OTHER PUBLICATIONS

Extended European search report dated May 29, 2020 issued over the corresponding EP Patent Application No. 18775807.3.

*Primary Examiner* — Audrey K Bradley
*Assistant Examiner* — Edward Bushard
(74) *Attorney, Agent, or Firm* — Carrier Blackman & Associates. P.C.; Joseph P. Carrier; Fulchand P. Shende

(57) ABSTRACT

A saddle riding vehicle includes a unit swing engine swingably supported on a body frame through a link member, and an exhaust device provided with an exhaust pipe and a catalyst device. The link member is disposed on an upper side of a crankcase. Part of the catalyst device is disposed below a cylinder section and is located in a region between an imaginary line that connects a link member coupling section coupling the link member to the body frame and a front end of the crankcase and an imaginary line that connects an exhaust pipe connection section of the unit swing engine connected with an end of the exhaust pipe and the link member coupling section, in side view. An exhaust device coupling section that couples the crankcase and the exhaust device is provided.

20 Claims, 21 Drawing Sheets

(51) Int. Cl.
*B62M 7/06* (2006.01)
*F01N 13/08* (2010.01)

(56) References Cited

FOREIGN PATENT DOCUMENTS

| | | |
|---|---|---|
| JP | S61-200409 A | 9/1986 |
| JP | H05-98959 A | 4/1993 |
| JP | H05-240036 A | 9/1993 |
| JP | H11-198891 A | 7/1999 |
| JP | 2006-250129 A | 9/2006 |
| JP | 2008-045515 A | 2/2008 |
| JP | 2013-036422 A | 2/2013 |
| JP | 2016-182926 A | 10/2016 |
| WO | 2014/129014 A1 | 8/2014 |

SADDLE RIDING VEHICLE

TECHNICAL FIELD

The present invention relates to a saddle riding vehicle that includes an exhaust device.

BACKGROUND ART

Conventionally, there has been known a saddle riding vehicle which includes a body frame, a unit swing engine swingably supported on the body frame through a link member, an exhaust pipe connected to the unit swing engine, and a catalyst device disposed at an intermediate portion of the exhaust pipe (see, for example, Patent Document 1). In the unit swing engine as disclosed in Patent Document 1, the exhaust pipe and the catalyst device are swung together with the unit swing engine.

PRIOR ART DOCUMENT

Patent Document

Patent Document 1: JP 201336422 A

SUMMARY OF THE INVENTION

Underlying Problem to be Solved by the Invention

In such a saddle riding vehicle, the presence of a link member may become an obstacle in laying out a catalyst device, and it is desired to enhance the degree of freedom in laying out the catalyst device. In addition, it is desired that the catalyst device can be disposed in a compact fashion, in order that the catalyst device swung together with the unit swing engine does not collide on other peripheral parts.

The present invention has been made in consideration of the above-mentioned circumstances. It is an object of the present invention to enhance the degree of freedom in laying out a catalyst device, to permit the catalyst device to be disposed in a compact fashion, and, further, to support the catalyst device stably and firmly even if an exhaust device and the catalyst device are swung together with a unit swing engine, in a saddle riding vehicle including a unit swing engine.

Means to Solve the Problem

In view of the above problem, according to a first present invention, there is provided
a body frame;
a unit swing engine having a cylinder section disposed substantially horizontally and a crankcase, the unit swing engine being swingably supported on the body frame through a link member; and
an exhaust device connected to the unit swing engine and including an exhaust pipe and a catalyst device disposed at an intermediate portion of the exhaust pipe,
wherein the link member is disposed on an upper side of the crankcase,
in side view, at least part of the catalyst device is disposed below the cylinder section and is located in a region between
an imaginary line connecting a link member coupling section for coupling the link member to the body frame and a front end of the crankcase and
an imaginary line connecting an exhaust pipe connection section of the unit swing engine connected with an end of the exhaust pipe and the link member coupling section, and
an exhaust device coupling section for coupling the crankcase and the exhaust device is provided.

According to the above-mentioned configuration, the link member is disposed on the upper side of the unit swing engine, and, in side view, at least part of the catalyst device is disposed below the cylinder section and is located in the region between an imaginary line that connects the coupling section coupling the link member to the body frame and the front end of the crankcase and an imaginary line that connects the exhaust pipe connection section of the unit swing engine connected with the end of the exhaust pipe and the coupling section. As a result, with the link member disposed on the upper side of the unit swing engine, a space can be secured on the lower side of the unit swing engine, and the catalyst device can be disposed utilizing this space. Further, since the catalyst device is located in the region between the imaginary line that connects the coupling section coupling the link member to the body frame and the front end of the crankcase and the imaginary line that connects the exhaust pipe connection section of the unit swing engine connected with the end of the exhaust pipe and the coupling section, the catalyst device can be disposed in a compact fashion such that the catalyst device does not come into contact with other peripheral parts. In addition, since the coupling section that couples the crankcase and the exhaust device is provided, the catalyst can be supported stably against swinging of the unit swing engine, even in the case where the exhaust pipe and the catalyst device are swung together with the unit swing engine.

In the above-mentioned configuration, the catalyst device may be disposed in such a direction that a longitudinal direction of the catalyst device is oriented in a transverse direction, and the exhaust device coupling section and the exhaust pipe connection section connecting the exhaust pipe and the cylinder section may be disposed in a manner of being allocated to left and right sides, with respect to a longitudinal directional center line of the catalyst device as viewed from a bottom.

According to the above-mentioned configuration, the longitudinal directional center of the catalyst device is located between the exhaust pipe connection section connecting the cylinder section and the exhaust pipe and the exhaust device coupling section coupling the exhaust device to the crankcase; therefore, the catalyst device can be stably supported by the unit swing engine.

In the above-mentioned configuration, the exhaust device coupling section may have a crankcase-side stay and an exhaust-device-side stay coupled to the crankcase-side stay, the crankcase-side stay and the exhaust-device-side stay may be disposed with an offset in the transverse direction, and the crankcase-side stay and the exhaust-device-side stay may be coupled with each other while being overlapped with each other in the transverse direction.

According to the above-mentioned configuration, the crankcase-side stay and the exhaust-device-side stay are disposed with an offset in the transverse direction, and the crankcase-side stay and the exhaust-device-side stay are coupled with each other while being overlapped with each other in the transverse direction; therefore, support rigidity can be enhanced.

In the above-mentioned configuration, the exhaust-device-side stay of the exhaust device coupling section may be provided on a catalyst device accommodating exhaust pipe in which to accommodate the catalyst device.

According to the above-mentioned configuration, the catalyst device with heavy weight is provided with the exhaust-device-side stay, whereby the catalyst device can be supported stably.

In the above-mentioned configuration, the crankcase may be split at a crankcase split surface into left and right portions, the exhaust pipe of the exhaust device may have a vertical section that extends downward from the exhaust pipe connection section of the cylinder section, a side extension section that is continuous to a downstream side of the vertical section and that extends toward one side with reference to an imaginary line passing through the crankcase split surface of the crankcase, and a curved section being continuous with the side extension section and turning back in a U shape, and the crankcase-side stay may be provided on the other side with reference to the imaginary line passing through the crankcase split surface.

According to the above-mentioned configuration, even in the case where the exhaust pipe extends while bypassing to one side with reference to the split surface of the crankcase and where the weight of the exhaust device is increased, the structure in which the crankcase-side stay is provided on the other side with reference to the imaginary line passing through the split surface of the crankcase ensures that the catalyst device can be stably supported on the unit swing engine.

According to the present invention, there is provided an exhaust device for a saddle riding vehicle, the exhaust device including:

an exhaust pipe for guiding an exhaust gas of an internal combustion engine; and a catalyst device disposed at an intermediate portion in the exhaust pipe, wherein the exhaust pipe has a catalyst device accommodating exhaust pipe accommodating the catalyst device, the catalyst device accommodating exhaust pipe has a catalyst case section accommodating the catalyst device, the catalyst device accommodating exhaust pipe has a structure having a first half and a second half split along an exhaust gas flow direction wherein joint edge sections of the first half and the second half are mated and united with each other, the catalyst case section of the catalyst device accommodating exhaust pipe includes reduced diameter sections holding the catalyst device, and the joint edge sections in the same section as the reduced diameter sections in a case of cutting perpendicularly to a splitting direction of the catalyst device accommodating exhaust pipe are made to be enlarged diameter sections larger than an outside diameter of the catalyst device.

According to the above-mentioned configuration, the catalyst device is held by the reduced diameter sections of the catalyst device accommodating exhaust pipe, whereby the catalyst device can be held, without need to separately provide a holder or a packing for holding the catalyst device. Further, the catalyst device accommodating exhaust pipe holding the catalyst device is composed of the first half and the second half split along the exhaust gas flow direction, and the joint edge sections in the same section as the reduced diameter sections in the case of cutting perpendicularly to the splitting direction of the catalyst device accommodating exhaust pipe are made to be the enlarged diameter sections larger than the outside diameter of the catalyst device. As a result, it is unnecessary to interpose SUS wool or packing between the catalyst device and the reduced diameter sections holding the catalyst device, so that it is possible to reduce the number of component parts and to hold the catalyst device with a simple structure.

In the above-mentioned configuration, the catalyst device accommodating exhaust pipe may have a structure wherein the first half and the second half are united with each other by welding the joint edge sections of the first half and the second half.

According to the above-mentioned configuration, although the catalyst device accommodating exhaust pipe has the structure in which the first half and the second half are united with each other by welding their joint portions, the joint edge sections in the same section as the reduced diameter sections in the case of cutting perpendicularly to the splitting direction of the catalyst device accommodating exhaust pipe are made to be the enlarged diameter sections larger than the outside diameter of the catalyst device, and, therefore, the joint edge sections of the first half and the second half can be welded to each other while holding the catalyst device by the reduced diameter sections while preventing the contact between the catalyst device and the joint edge sections of the catalyst case section. Accordingly, the catalyst device can be prevented from being fused to the joint edge sections.

In the above-mentioned configuration, the catalyst device may include a tubular outer shell section serving as an outer shell, and a catalyst accommodated in the outer shell section, and the enlarged diameter sections may be provided with a gap between the enlarged diameter sections and the outer shell section, and the reduced diameter sections may be put in contact with the outer shell section.

According to the above-mentioned configuration, the enlarged diameter sections of the joint edge sections in the same section as the reduced diameter sections are provided with a gap between themselves and the outer shell section, and the reduced diameter sections are put in contact with the outer shell section. Therefore, the outer shell section of the catalyst device can be held by the reduced diameter sections of the first half and the second half, and, at the time of welding, the outer shell section of the catalyst device can be prevented from being fused to the joint edge sections.

In the above-mentioned configuration, the catalyst case section may be larger in diameter than the outer shell section of the catalyst device, and the catalyst case section may include case sections provided with a gap between the case sections and the outer shell section.

According to the above-mentioned configuration, since the case sections are larger in diameter than the outer shell section of the catalyst device and are provided with a gap between itself and the outer shell section, it can be ensured that even in the case where the catalyst is brought to a high temperature, the heat of the catalyst is hardly transmitted to the catalyst device accommodating exhaust pipe.

In the above-mentioned configuration, the reduced diameter sections may be provided on an upstream side in regard to an exhaust gas flow direction of the catalyst device, and may hold the catalyst device.

According to the above-mentioned configuration, with the reduced diameter sections provided on an upstream side of the catalyst device, the upstream side of the catalyst device can be held by the reduced diameter sections, and a packing or a holding member can be abolished.

According to a third present invention, there is provided an exhaust device for a saddle riding vehicle, the exhaust device including:

an exhaust pipe having a curved section; and a catalyst disposed in the exhaust pipe on a downstream side of the curved section of the exhaust pipe, wherein a center axis of the catalyst is offset toward a curving directionally outer side with respect to a center axis of the curved section of the exhaust pipe, and a diffusion member is disposed on a curving directionally outer side with respect to the center axis of the exhaust pipe and on an upstream side of the catalyst.

According to the above-mentioned configuration, it can be ensured that the exhaust gas is liable to impinge on the catalyst which is disposed on the curving directionally inner side and downstream of the curved section of the exhaust pipe where the exhaust gas would hardly impinge. Therefore, the exhaust gas can be effectively clarified. In addition, the diffusion member can be easily disposed in conformity with the space on the upstream side of the catalyst in the exhaust pipe, so that it is possible to enhance the exhaust gas diffusing effect for the catalyst, to prevent the exhaust gas from flowing toward the curving directionally outer side in a partialized manner, and to cause the exhaust gas to uniformly impinge on the catalyst.

In the above-mentioned configuration, the diffusion member may have a straightening vane that is inclined at an acute angle in relation to the center axis of a downstream end of the curved section of the exhaust pipe, faces a flow of an exhaust gas, and is oriented toward a curving directionally inner side with reference to the center axis of the curved section.

According to the above-mentioned configuration, the exhaust gas flow direction can be changed while restraining flow resistance, and it can be ensured that the exhaust gas is liable to impinge on the whole part of the catalyst.

In the above-mentioned configuration, the straightening vane may have a communication opening through which an upstream side and a downstream side of an exhaust gas flow communicate with each other.

According to the above-mentioned configuration, the straightening vane that is inclined at an acute angle with reference to the center axis of the downstream end of the curved section of the exhaust pipe and that faces the flow of the exhaust gas has the communication opening. This ensures that the exhaust gas can be divided into the exhaust gas passing through the communication opening and flowing in a direction guided from the exhaust pipe and the exhaust gas changed in flow direction by the straightening vane. Consequently, the exhaust gas can be effectively diffused, and the exhaust gas can be exposed to the whole part of the catalyst, whereby efficient clarification can be achieved.

In the above-mentioned configuration, a catalyst device accommodating exhaust pipe with the catalyst accommodated therein may be connected to a downstream side of the curved section, the catalyst device accommodating exhaust pipe may have a connection section enlarged in diameter along an exhaust gas flow direction on an upstream side of the catalyst, and the diffusion member may be disposed inside the connection section.

According to the above-mentioned configuration, the catalyst and the diffusion member in the connection section are favorably disposed in the catalyst device accommodating exhaust pipe, and the exhaust device of the saddle riding vehicle is configured efficiently in a compact fashion.

In the above-mentioned configuration, the diffusion member may have an outer peripheral edge section formed to be along an inner peripheral surface of the connection section of the catalyst device accommodating exhaust pipe by turning back an upstream-side peripheral edge of the straightening vane in an outer peripheral side downstream direction, and the outer peripheral edge section may be attached to the connection section.

According to the above-mentioned configuration, the diffusion member can be attached at a favorable position simply and easily.

Advantageous Effects of the Invention

According to the present invention, in a saddle riding vehicle including a unit swing engine, the degree of freedom in laying out a catalyst device can be enhanced, the catalyst device can be disposed in a compact fashion, and, further, the catalyst device can be supported stably and firmly even if an exhaust device and the catalyst device are swung together with the unit swing engine.

MODE FOR CARRYING OUT THE INVENTION

An embodiment of the present invention will be described below, based on FIGS. 1 to 21. Note that in the description, the directions such as the forward, rearward, leftward, rightward, upward and downward directions are the same as those with reference to a vehicle body, unless otherwise specified. In addition, symbol FR in each drawing indicates the front side of the vehicle body, symbol UP indicates the upper side of the vehicle body, and symbol LH indicates the left-hand side of the vehicle body.

Figure 1:
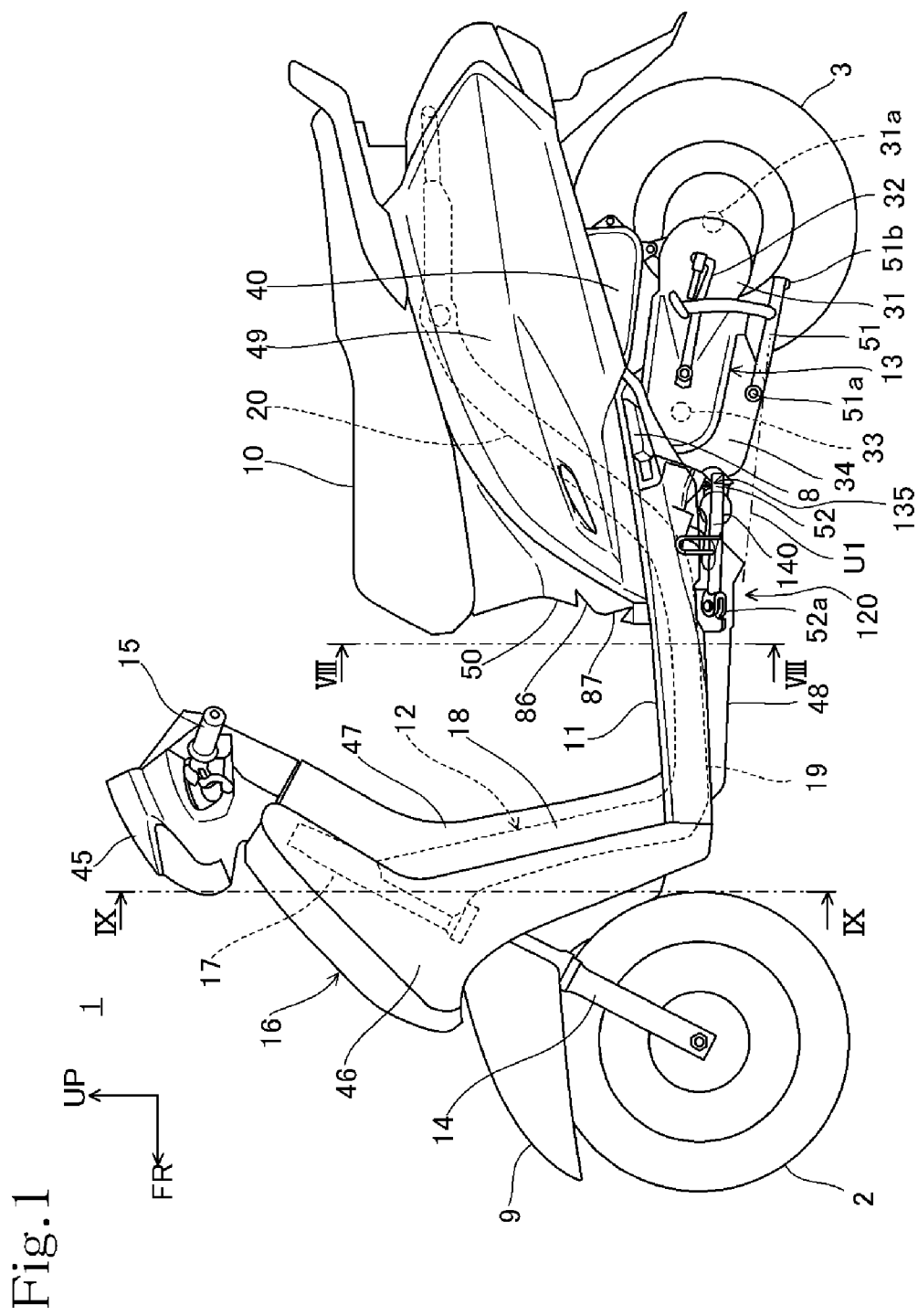
FIG. 1 is a left side view of a saddle riding vehicle according to an embodiment of the present invention.

FIG. 1 is a left side view of a saddle riding vehicle according to an embodiment of the present invention. Note that in FIG. 1, of those components which are provided respectively in a left-right pair, only the ones on the left side are denoted.

The saddle riding vehicle 1 is a scooter type motorcycle having a low-floor step floor 11 on which a rider seated on a seat 10 puts his or her feet, in which a front wheel 2 is provided on a front side of a body frame 12, and a rear wheel 3 which is a driving wheel is shaft-supported on a unit swing engine 13 disposed at a rear portion of the vehicle.

The saddle riding vehicle 1 includes a front fork 14 shaft-supported on a front end portion of the body frame 12, and the front wheel 2 is shaft-supported on a lower end portion of the front fork 14. A handlebar 15 steered by the rider is attached to an upper end of the front fork 14.

The saddle riding vehicle 1 includes a body cover 16 covering a vehicle body such as the body frame 12.

Figure 2:
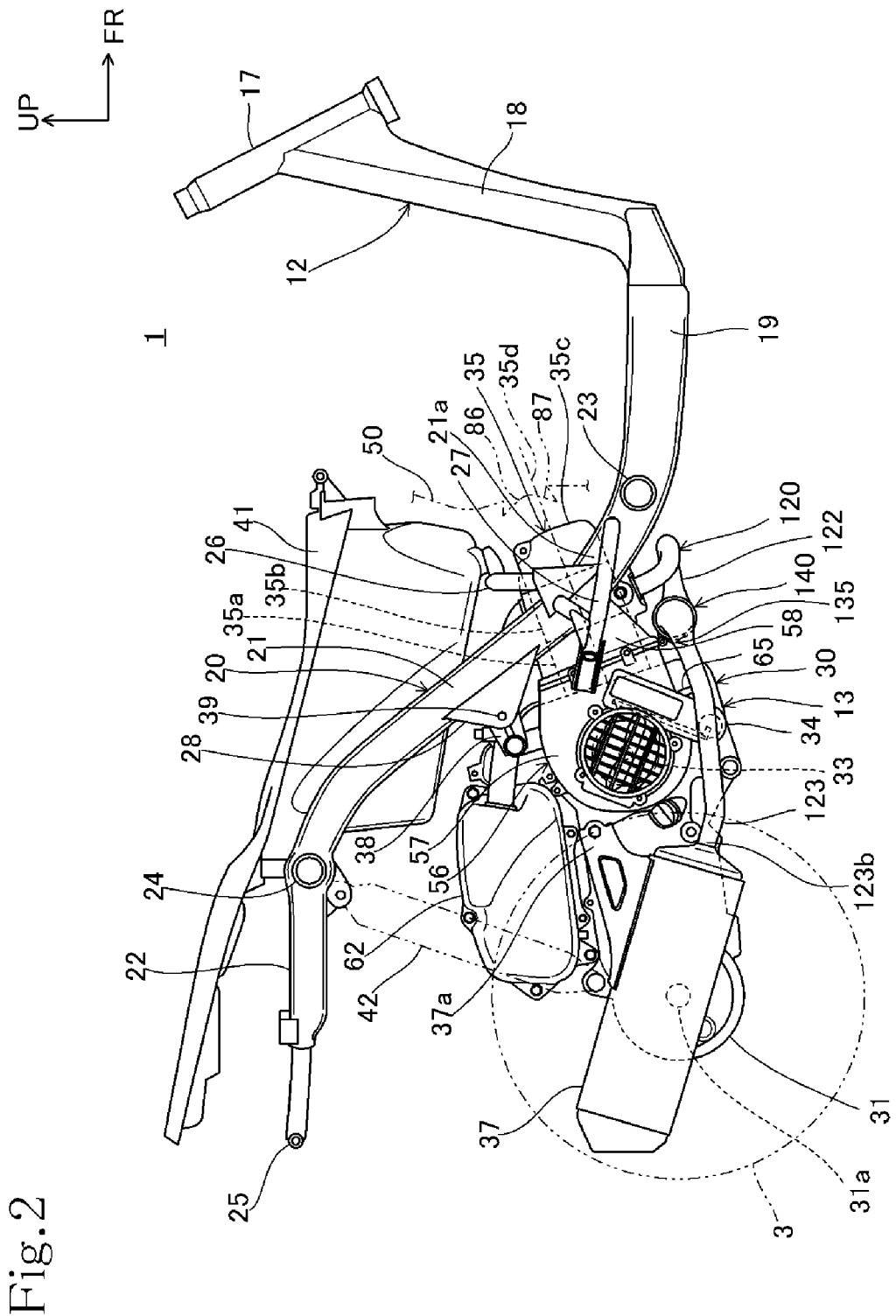
FIG. 2 is a right side view of a major part of the saddle riding vehicle.
Figure 3:
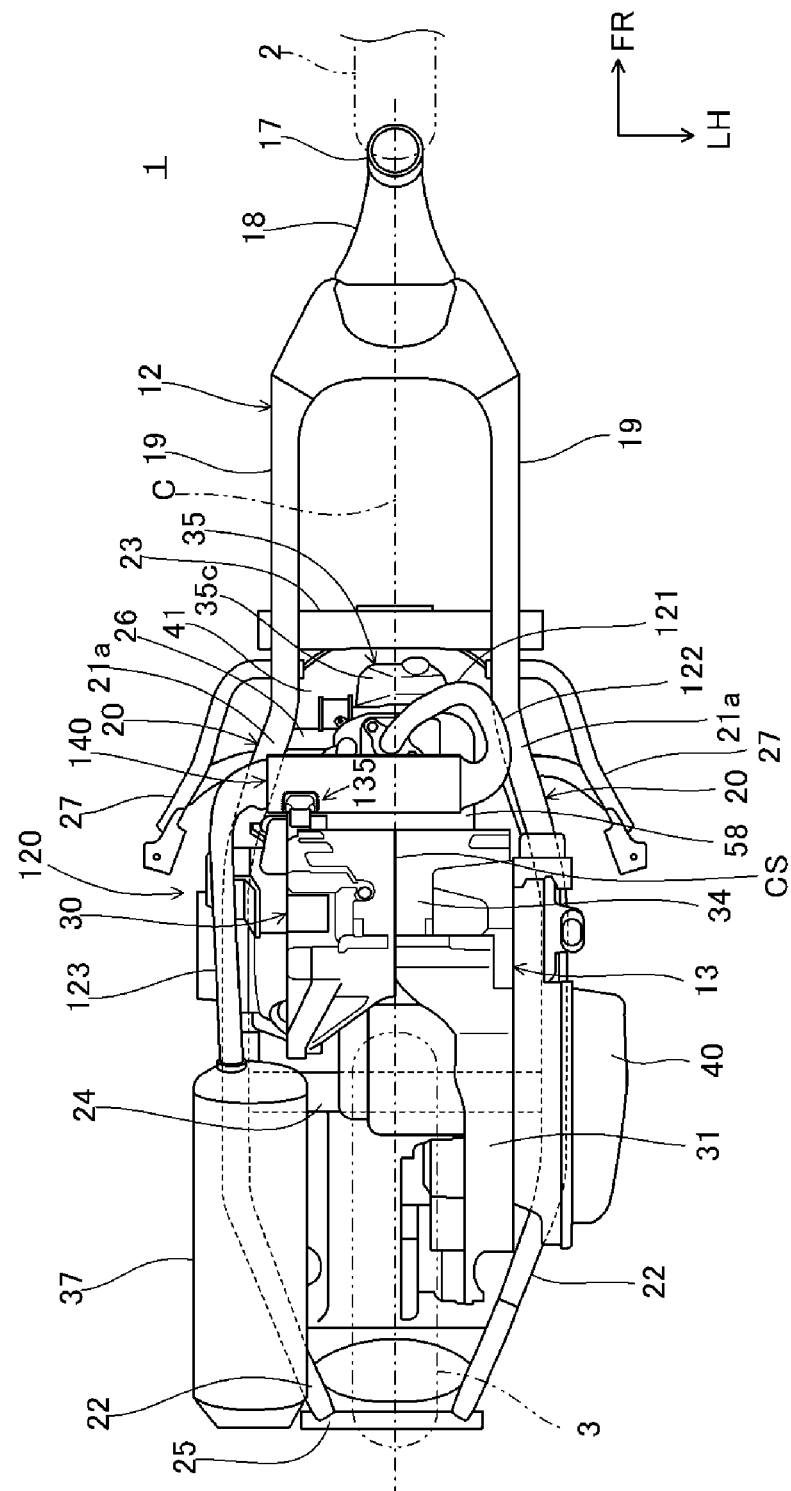
FIG. 3 is a plan view, as viewed from below, of the saddle riding vehicle in the state of FIG. 2.

FIG. 2 is a right side view of a major part of the saddle riding vehicle 1. In FIG. 2, there is depicted a state in which the body cover 16, the seat 10, the front fork 14 and the like are detached. FIG. 3 is a plan view, as viewed from below, of the saddle riding vehicle 1 in the state of FIG. 2.

Referring to FIGS. 1 to 3, the body frame 12 includes a head pipe 17 provided at a front end, a down frame 18 extending rearwardly downward from the head pipe 17, a pair of left and right lower frames 19 (frames) extending substantially horizontally rearward from a lower end of the down frame 18, and a pair of left and right seat frames 20 extending rearwardly upward from rear ends of the lower frames 19.

The lower frames 19 and the seat frames 20 are formed in the shape of pipes extending in a longitudinal vehicle direction.

The lower frames 19 are provided substantially in parallel to a transverse-directional-centers line C of the saddle riding vehicle 1, namely, a straight line by which the centers of the front wheel 2 and the rear wheel 3 in the transverse directional (left-right directional) are connected. An imaginary line C passing through a crankcase split surface CS which will be described later may coincide with this transverse-directional-centers line.

Each seat frame 20 includes a slant section 21 extending rearwardly upward from each lower frame 19, and a horizontal section 22 extending substantially horizontally from a rear end of the slant section 21 to a rear end of the body frame 12.

At front end portions of the slant sections 21, there are provided enlarged width sections 21a inclined such that a transverse directional gap therebetween increases in going rearward.

The body frame 12 includes a cross member 23 connecting the rear ends of the lower frames 19 in the transverse direction, an upper cross member 24 connecting the rear ends of the slant sections 21 in the transverse direction, and a rear cross member 25 connecting the rear ends of the horizontal sections 22 in the transverse direction.

In addition, the body frame 12 includes a box support frame 26 connecting the enlarged width sections 21a of the slant sections 21 in the transverse direction, and a pair of left and right support frames 27 extending respectively toward transverse directionally outer sides from outside surfaces of the enlarged width sections 21a.

Further, the body frame 12 includes a pair of left and right engine brackets 28 projecting in directions from rear surfaces of the slant sections 21 of the seat frames 20.

The unit swing engine 13 is a unit swing power unit in which the engine 30 as an internal combustion engine and an arm section 31 supporting the rear wheel 3 are united with each other. In the inside of the arm section 31 formed in a hollow case shape, a belt-type continuously variable transmission (not illustrated) for transmitting an output of the engine 30 to the rear wheel 3 is accommodated. On an outside surface of the arm section 31, a kick pedal 32 for manually starting the engine 30 is provided.

The engine 30 includes a crankcase 34 which accommodates a crankshaft 33 extending in the transverse direction, and a cylinder section 35 extending substantially horizontally forward from a front surface portion of the crankcase 34.

Figure 5:
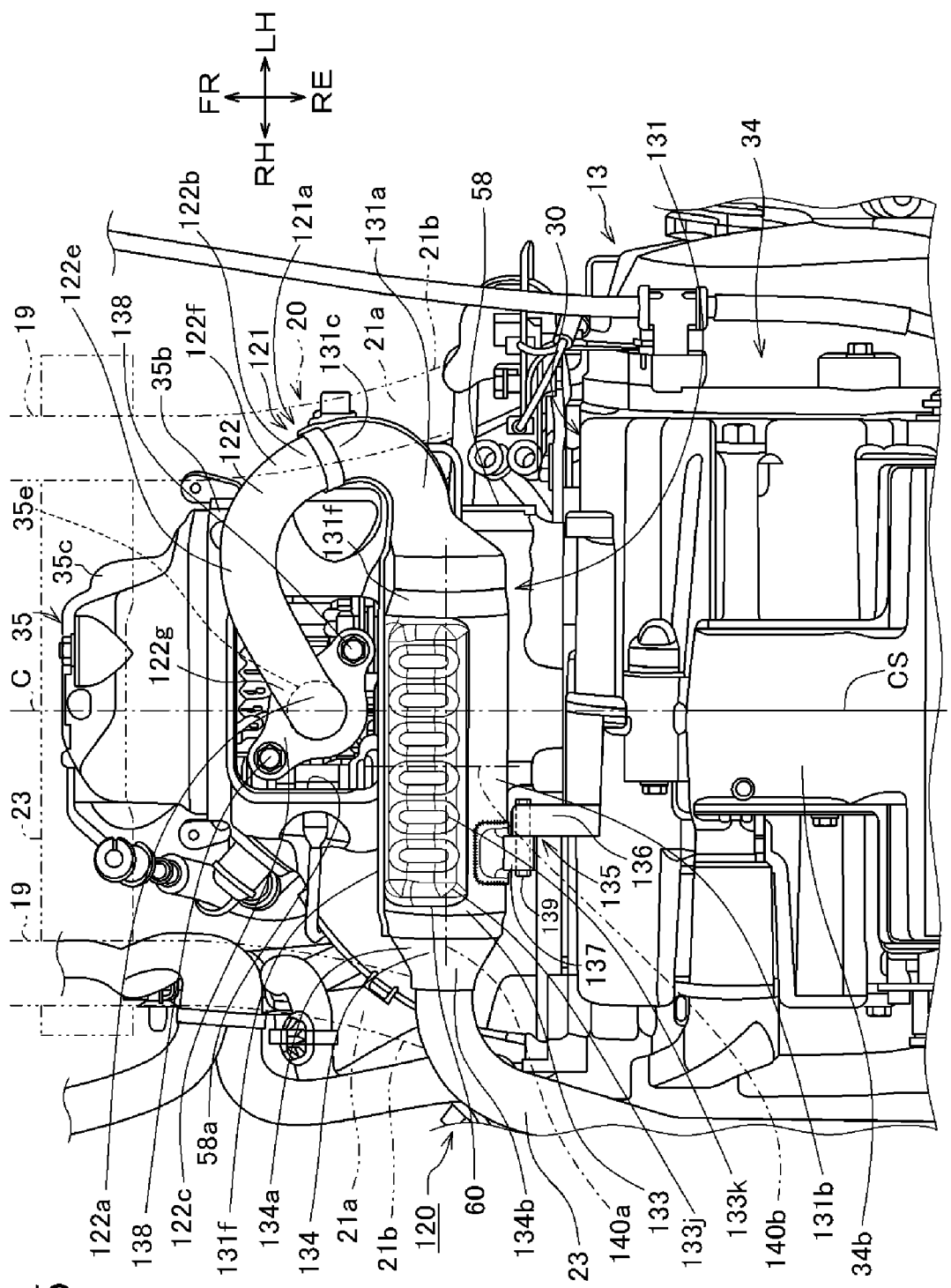
FIG. 5 is a plan view, as viewed from below, of the peripheral part around the unit swing engine.

The cylinder section 35 includes a cylinder block 35a, a cylinder head 35b and a head cover 35c, in this order from the crankcase 34 side. An axis 35d of the cylinder section 35, that is, an axis of a cylinder bore in the cylinder block 35a in which a piston is reciprocated, extends substantially horizontally in a posture of being inclined forwardly slightly upward. The axis 35d of the cylinder section 35 extends in the longitudinal vehicle direction. The crankcase 34 is a left-right split case divided at the crankcase split surface CS. As depicted in FIG. 5, a line passing through the crankcase split surface CS in bottom view of the saddle riding vehicle 1 is defined as an imaginary line C.

An intake device of the engine 30 includes an air cleaner box 40, and a throttle body (not illustrated) connected to the downstream side of the air cleaner box 40. The air cleaner box 40 is supported by the arm section 31, and is located on an upper side of the arm section 31. The throttle body is disposed on a front side of the air cleaner box 40 and on an upper side of the unit swing engine 13, and its downstream end is connected to an intake port (not illustrated) at an upper surface of the cylinder head 35b.

Outside air taken in through the air cleaner box 40 is mixed with a fuel jetted from a fuel injection valve (not illustrated) to be an air-fuel mixture, which is sent through the intake port of the engine 30 into a cylinder part (not illustrated), to be combusted, and the combustion gas is sent through an exhaust port 30c to the exhaust device 120.

The exhaust device 120 of the engine 30 is led out from the cylinder head 35b and extends rearward, and its rear end as a downstream end is connected to a muffler 37 as a silencer. The muffler 37 is disposed on a right side (one lateral side) of the rear wheel 3. The muffler 37 is fixed to a right rear portion of the crankcase 34 through a stay 37a at a front portion.

The arm section 31 extends rearward from a left rear portion of the crankcase 34, and is located on a left side (other lateral side) of the rear wheel 3. The rear wheel 3 is shaft-supported by a rear wheel axle 31a at a rear end portion of the arm section 31, and supported in a cantilever fashion by the arm section 31.

Specifically, the muffler 37 is disposed on transverse directionally one side (right side) in relation to the rear wheel 3 located on the imaginary line C (FIG. 3) passing through the crankcase split surface CS, whereas the arm section 31 is disposed on the transverse directionally other side (left side) in relation to the rear wheel 3.

The unit swing engine 13 is swingably supported on the body frame 12 through a link member 38 disposed on an upper side of the crankcase 34.

The link member 38 is coupled to the body frame 12 through a pivot shaft 39 (coupling section) connecting the engine brackets 28 of the seat frames 20 in the transverse direction. The unit swing engine 13 is swung with the pivot shaft 39 as a center.

A rear suspension 42 that attenuates swinging of the unit swing engine 13 is arranged between the arm section 31 and the seat frame 20.

An accommodation box 41 in which things such as a helmet can be accommodated is provided between the left and right seat frames 20 on an upper side of the engine 30. An opening at an upper side of the accommodation box 41 is openably covered by the seat 10. A front portion of the accommodation box 41 is supported by the box support frame 26 extending upward from the enlarged width sections 21a.

As illustrated in FIG. 1, the body cover 16 includes an upper cover 45 covering a peripheral part around the handlebar 15, a front cover 46 covering the head pipe 17 and the down frame 18 from the upper and lateral sides, and a leg shield 47 mated with the front cover 46 from the rear side to cover the head pipe 17 and the down frame 18.

In addition, the body cover 16 includes an under cover 48 covering the lower frames 19 from below, a step floor 11 covering the lower frames 19 from above, a pair of left and right rear side bars 49 covering the seat frames 20 and the accommodation box 41 from lateral sides on the lower side of the seat 10, and a center lower cover 50 covering the accommodation box 41 and the cylinder section 35 from the front side on the lower side of the seat 10.

Besides, the saddle riding vehicle 1 includes a front fender 9 covering the front wheel 2 from the front side.

A center stand 51 for parking the saddle riding vehicle 1 in an upright state is attached to a lower surface portion of the crankcase 34. The center stand 51 is supported on the crankcase 34 through a center stand rotating shaft 51a, and is rotated with the center stand rotating shaft 51a as a center, whereby it is put into a stored state or a parking state.

A side stand 52 for parking the saddle riding vehicle 1 in a state of being inclined in the transverse direction is attached to a rear portion of the lower frame 19 on the left side (the transverse directionally other side), and is located on a front side of the cylinder section 35. The side stand 52 is supported through a side stand rotating shaft 52a provided on the lower frame 19 on a front side of the cylinder section 35, and is rotated with the side stand rotating shaft 52a as a center, whereby it is put into a stored state or a parking state.

The structure of a peripheral part around the unit swing engine 13 will be described in detail below.

Figure 4:
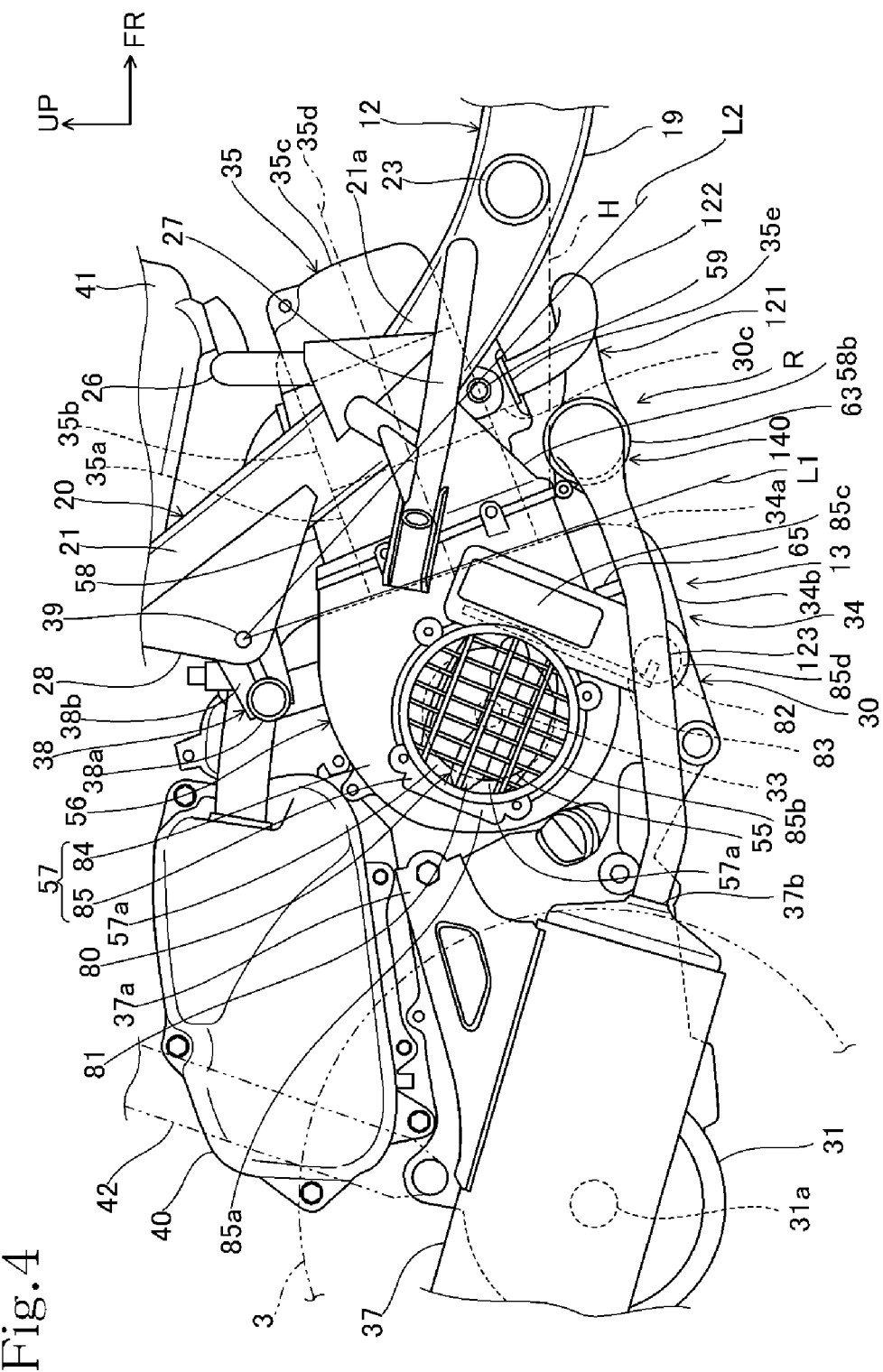
FIG. 4 is a right side view depicting the structure of a peripheral part around a unit swing engine.
Figure 6:
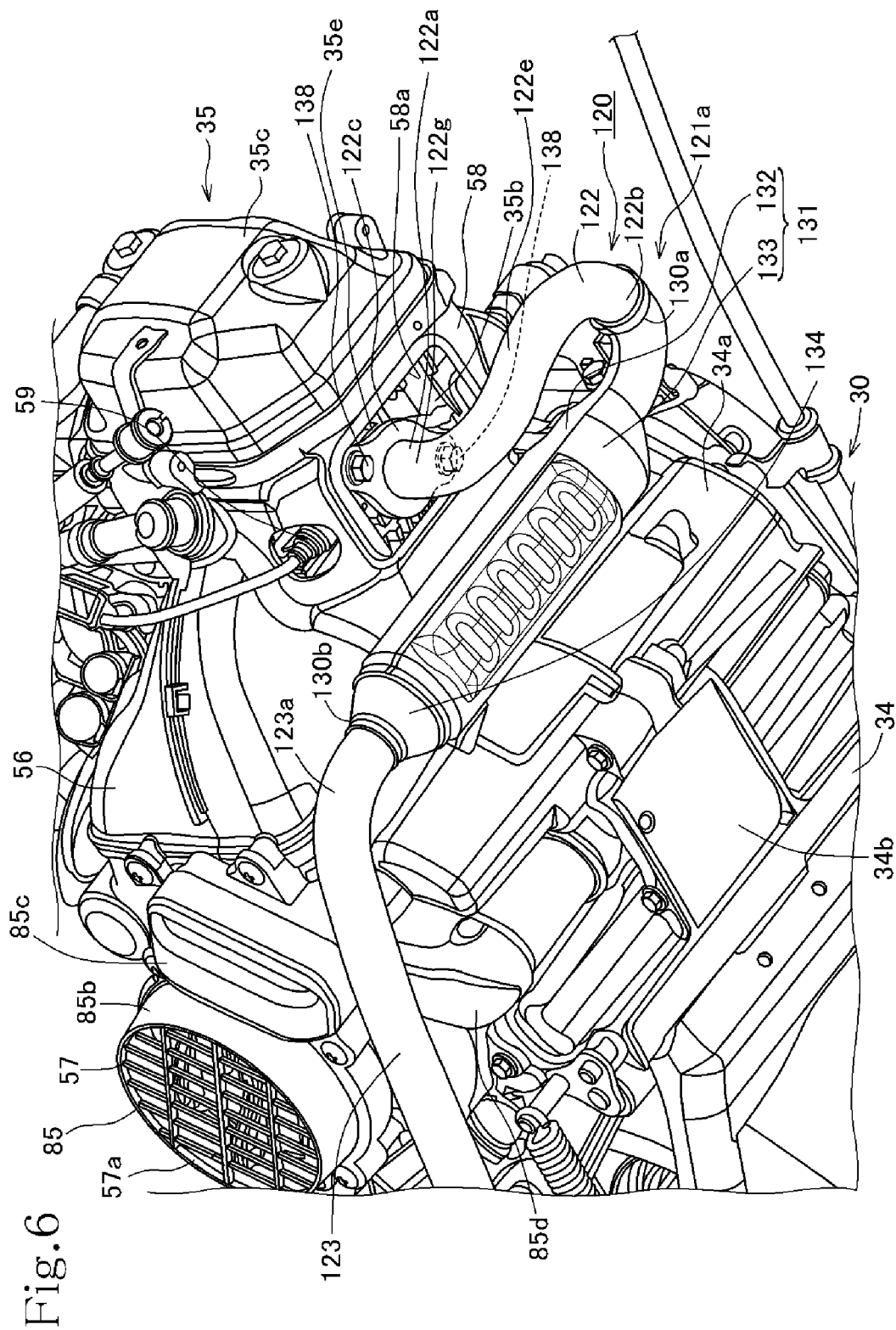
FIG. 6 is a perspective view, as viewed from a right lower side, of the peripheral part around the unit swing engine.

FIG. 4 is a right side view depicting the structure of a peripheral part around the unit swing engine 13. FIG. 5 is a plan view, as viewed from below, of the peripheral part around the unit swing engine 13. FIG. 6 is a perspective view, as viewed from a right lower side, of the peripheral part around the unit swing engine 13. Note that in FIGS. 4 to 6, the side stand 52 and the center stand 51 and the like are not illustrated.

Referring to FIGS. 4 to 6, the unit swing engine 13 is disposed on a lower side of the accommodation box 41 and on the rear side of the slant sections 21 of the seat frames 20, and is supported in the manner of being suspended from the seat frames 20 through the link member 38.

The link member 38 includes a rod-shaped link stay section 38a fixed to an upper surface of the crankcase 34 and extending in the transverse direction, and a pair of coupling pieces 38b extending toward the engine brackets 28 from both transverse directional end portions of the link stay section 38a. The unit swing engine 13 is coupled to the body frame 12 by a structure in which front end portions of the coupling pieces 38b of the link member 38 are shaft-supported by the pivot shaft 39.

The cylinder section 35 extends forward from the crankcase 34, and is located between the enlarged width sections 21a of the seat frames 20 on a lower side of the box support frame 26. Specifically, the cylinder head 35b is located between the enlarged width sections 21a, and the head cover 35c extends more to the forward side than the enlarged width sections 21a. The head cover 35c is located on the rear side relative to the cross member 23.

The unit swing engine 13 includes a cooling fan 55 (FIG. 4) on the opposite side from the arm section 31 of the crankcase 34, or on transverse directionally one side of the crankcase 34. The unit swing engine 13 is of a forced cooling system in which the engine 30 is cooled by blowing air by the rotation of the cooling fan 55. The cooling fan 55 is fixed to a shaft end portion of the crankshaft 33 projecting to transverse directionally one side of the crankcase 34, and is rotated as one body with the crankshaft 33 at the time of operation of the engine 30, thereby blowing cooling air for cooling the engine 30.

The unit swing engine 13 includes a shroud 56 that covers the engine 30 from outside to thereby guide the cooling air of the cooling fan 55 to the engine 30. The shroud 56 includes a fan cover 57 covering one lateral side surface of the crankcase 34, and a cylinder cover 58 covering the cylinder section 35.

The fan cover 57 is attached to one lateral side surface of the crankcase 34, to cover the cooling fan 5. The fan cover 57 is provided in an outside surface thereof with an air intake port 57a causing the inside of the fan cover 57 to communicate with the outside.

The cylinder cover 58 is provided such as to surround the cylinder section 35 from the periphery of the axis 35d, and covers the cylinder section 35 over the whole circumference of the latter. A rear end of the cylinder cover 58 is connected to a front end of the fan cover 57, and the inside of the fan cover 57 and the inside of the cylinder cover 58 communicate with each other. A front end of the cylinder cover 58 is connected to a rear end portion of the head cover 35c, and the cylinder cover 58 covers the cylinder block 35a and the cylinder head 35b.

The cylinder cover 58 is provided, at its lower surface portion covering a lower surface of the cylinder head 35b, with an exhaust pipe passing hole 58a opening to the lower side.

As depicted in FIG. 4, a front end 34a of the crankcase 34 is located on a rear lower side of the cylinder section 35. Specifically, the front end 34a is located on a lower side of a rear end portion of the cylinder block 35a. In addition, the front end 34a is located below a lower edge of the fan cover 57.

An oil pan section 34b in which to reserve an oil for lubricating the inside of the engine 30 is provided at a lower portion of the crankcase 34, and the oil pan section 34b is bulged to below a lower edge of the fan cover 57. The front end 34a is a front end of the oil pan section 34b.

The unit swing engine 13 includes an opening/closing mechanism 80 for opening and closing the air intake port 57a of the fan cover 57. The opening/closing mechanism 80 includes a movable louver 81 openably closing the air intake port 57a, an actuator 82 as a drive source for the movable louver 81, and a link mechanism 83 that couples the actuator 82 and the movable louver 81 and transmits a driving force of the actuator 82 to the movable louver 81.

The movable louver 81 includes a plurality of vane members aligned substantially in parallel to one another, and closes the air intake port 57a from inside. With each of the vane members rotated, the air intake port 57a is opened and closed.

The actuator 82 is of a temperature-sensitive system, and a driving section connected to the link mechanism 83 is expanded and contracted by heat of the engine 30. The actuator 82 is disposed in the vicinity of the oil pan section 34b such as to easily detect the heat of the engine 30, and is located at one lateral side surface of a lower portion of the crankcase 34.

The link mechanism 83 is disposed to extend vertically on one lateral side of the crankcase 34 and on the front side of the cooling fan 55, and couples the movable louver 81 and the actuator 82.

For example, in the case where the engine 30 is at a temperature of not higher than a predetermined temperature, the opening/closing mechanism 80 closes the air intake port 57a, to promote warm-up of the engine 30. In a state in which the temperature of the engine 30 becomes high, the opening/closing mechanism 80 opens the air intake port 57a, to promote cooling of the engine 30.

The fan cover 57 includes a cover main body section 84 attached to one lateral side surface of the crankcase 34 to cover the cooling fan 55 from the periphery, and a louver cover 85 covering the movable louver 81 and the cooling fan 55 from outside.

The louver cover 85 includes a plate-shaped base section 85a attached to the cover main body section 84, a tubular section 85b extending toward a transverse directionally outer side from the base section 85a, a link cover section 85c covering the link mechanism 83 from outside, and an actuator cover section 85d covering the actuator 82 from outside.

The air intake port 57a is an opening provided on the transverse directionally outer edge of the tubular section 85b. A lattice-shaped guard member is provided in the opening.

As depicted in FIG. 2, the exhaust device 120 that discharges the exhaust gas of the engine 30 includes an exhaust pipe 121 that is connected to the engine 30 and discharges the exhaust gas, a catalyst device 140 that is disposed inside an intermediate portion of the exhaust pipe 121 and clarifies the exhaust gas, and the muffler 37 connected to the downstream side of the exhaust pipe 121.

As depicted in FIG. 4, the exhaust device 120 including the catalyst device 140 is disposed utilizing a space R on a lower side of the cylinder section 35 and the crankcase 34, and is fixed to the unit swing engine 13 as will be described later; therefore, it is swung as one body with the unit swing engine 13, with the pivot shaft 39 as a center.

The exhaust pipe 121 includes an upstream-side exhaust pipe 122 connected to the exhaust port 30c opening in a lower surface of the engine 30, a catalyst device accommodating exhaust pipe 131 which is provided on the downstream side of the upstream-side exhaust pipe 122 and in which to accommodate the catalyst device 140, and a downstream-side exhaust pipe 123 provided on the downstream side of the catalyst device 140. A downstream end of the downstream-side exhaust pipe 123 is connected to the muffler 37.

As illustrated in FIGS. 4 and 5, an exhaust pipe connection section 35e which is a downstream end of the exhaust port 30c and to which the upstream side of the exhaust pipe 121 is connected is provided at a lower surface of the cylinder head 35b. As depicted in FIG. 6, a first oxygen sensor 59 that detects oxygen in the exhaust gas passing through the exhaust port is provided at one lateral side surface of the exhaust pipe connection section 35e. Further, as depicted in FIG. 11, an oil temperature sensor 69 for detecting the temperature of an oil in the cylinder head 35b is attached to the other lateral side surface of the cylinder head 35b.

Figure 11:
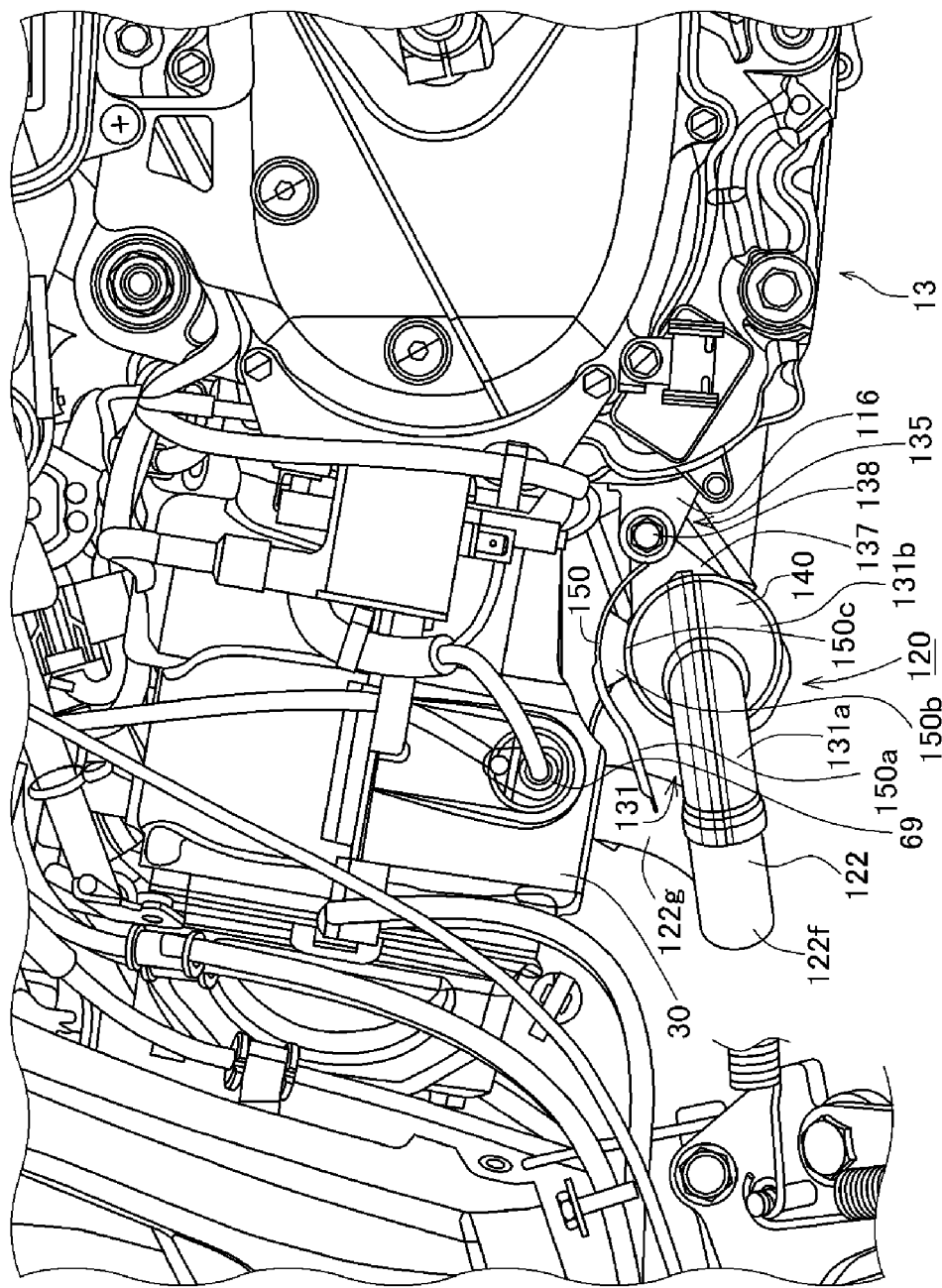
FIG. 11 is a left side view, as viewed from the left side, of the peripheral part around the unit swing engine.

As illustrated in FIGS. 5, 6 and 11, the upstream-side exhaust pipe 122 includes a vertical section 122g extending downward from the exhaust pipe connection section 35e of the cylinder head 35b, a side extension section 122e extending toward the other side in relation to the crankcase split surface CS on a front side of the catalyst device 140, and a curved section 122f curved toward a rear side and toward one side in relation to the crankcase split surface CS from a downstream end of the side extension section 122e. The curved section 122f of the upstream-side exhaust pipe 122 is connected to an exhaust pipe curved section 131$a_1$ of the catalyst device accommodating exhaust pipe 131 to be described later, to be a curved section 121a which turns back in a U shape.

As depicted in FIG. 4, a flange section 122c attached to the exhaust pipe connection section 35e of the engine 30 is firmly attached to an upstream end portion 122a of the upstream-side exhaust pipe 122. The flange section 122c is provided with a pair of bolt passing holes 122d, and the upstream end portion 122a is attached to the exhaust pipe connection section 35e of the cylinder head 35b by bolts 138. As illustrated in FIGS. 5 and 6, the upstream end portion 122a of the upstream-side exhaust pipe 122 is connected to the exhaust pipe connection section 35e by passing through the exhaust pipe passing hole 58a of the cylinder cover 58.

As depicted in FIG. 5, the exhaust pipe connection section 35e connected with the upstream end portion 122a of the upstream-side exhaust pipe 122 is located on the imaginary line C passing through the crankcase split surface CS, in bottom view, and the side extension section 122e extends toward the other side opposite to transverse directionally one side where the muffler 37 is located, from the transverse-directional-centers. Specifically, the side extension section 122e extends obliquely toward the transverse directionally other side and the front side.

As illustrated in FIG. 5, the curved section 121a of the exhaust pipe 121 and the catalyst device 140 are located on the transverse directionally inner side in relation to the enlarged width section 21a of the seat frame 20 on the transverse directionally other side.

Figure 12:
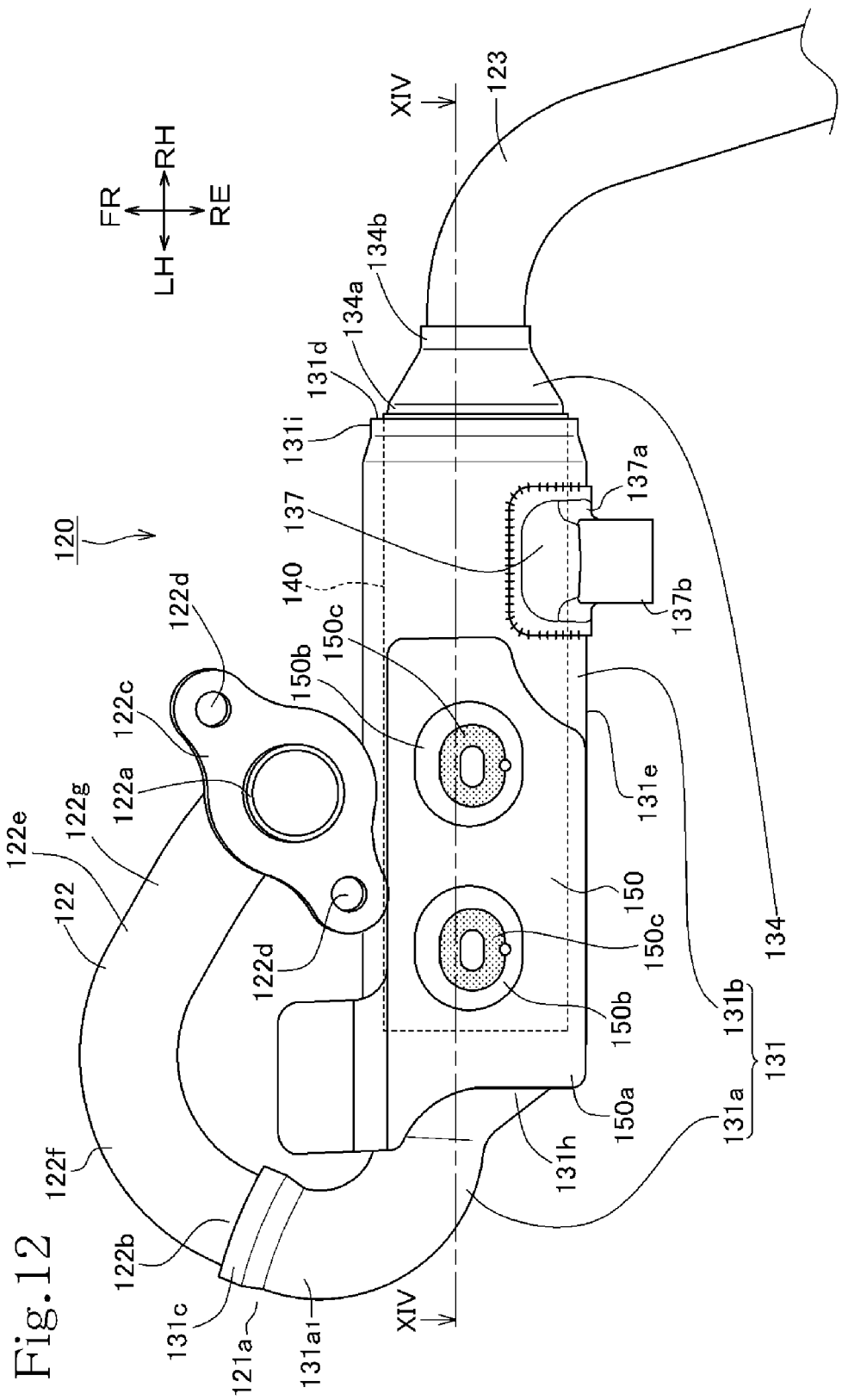
FIG. 12 is a plan view of a catalyst device accommodating exhaust pipe.
Figure 13:
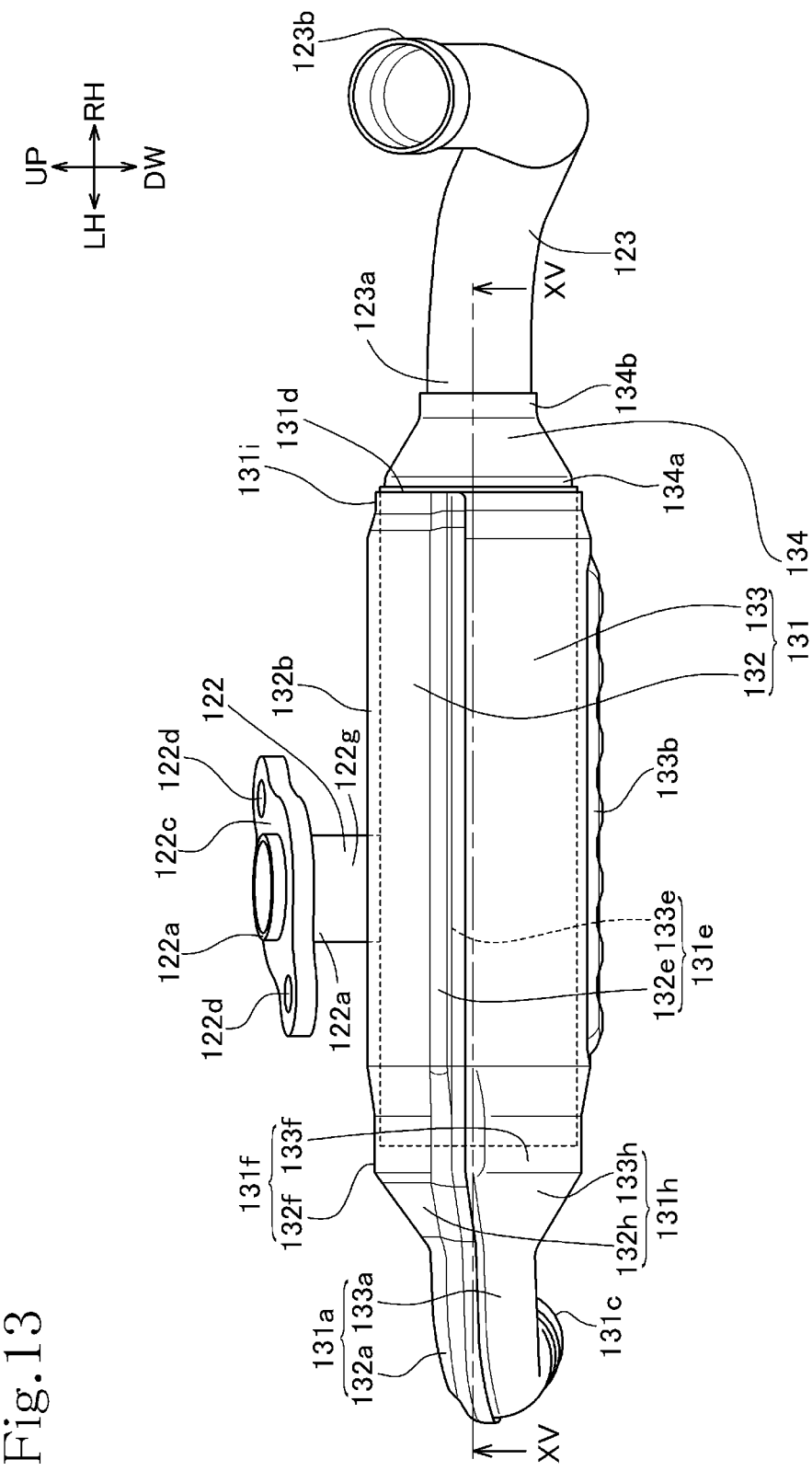
FIG. 13 is a rear view of the catalyst device accommodating exhaust pipe in a state in which an exhaust-device-side stay is removed.

The catalyst device 140 and the catalyst device accommodating exhaust pipe 131 inside which to accommodate the catalyst device 140 will be described in detail below. As depicted in FIGS. 5, 12 and 13, an upstream end portion 131c of the catalyst device accommodating exhaust pipe 131 inside which to accommodate the catalyst device 140 is connected to a downstream end portion 122b of the upstream-side exhaust pipe 122. A connection pipe 134 is mated, welded and united with the downstream side of the catalyst device accommodating exhaust pipe 131.

The catalyst device accommodating exhaust pipe 131 includes an exhaust pipe section 131a which is formed in a curved shape such as to go from the rear side toward the left side in continuity with the upstream-side exhaust pipe 122, a catalyst case section 131b which is enlarged in diameter as compared to the exhaust pipe section 131a and inside which to accommodate the catalyst device 140, and a connection section 131h which connects the exhaust pipe section 131a and the catalyst case section 131b and which is gradually enlarged in diameter from the exhaust pipe section 131a. An upstream end portion 134a of the connection pipe 134 is united by welding with a downstream end portion 131d of the catalyst device accommodating exhaust pipe 131. As depicted in FIG. 3, the catalyst case section 131b is located on a lower side of the engine 30, and is disposed such that its longitudinal direction is oriented in the transverse direction of the saddle riding vehicle 1.

Figure 14:
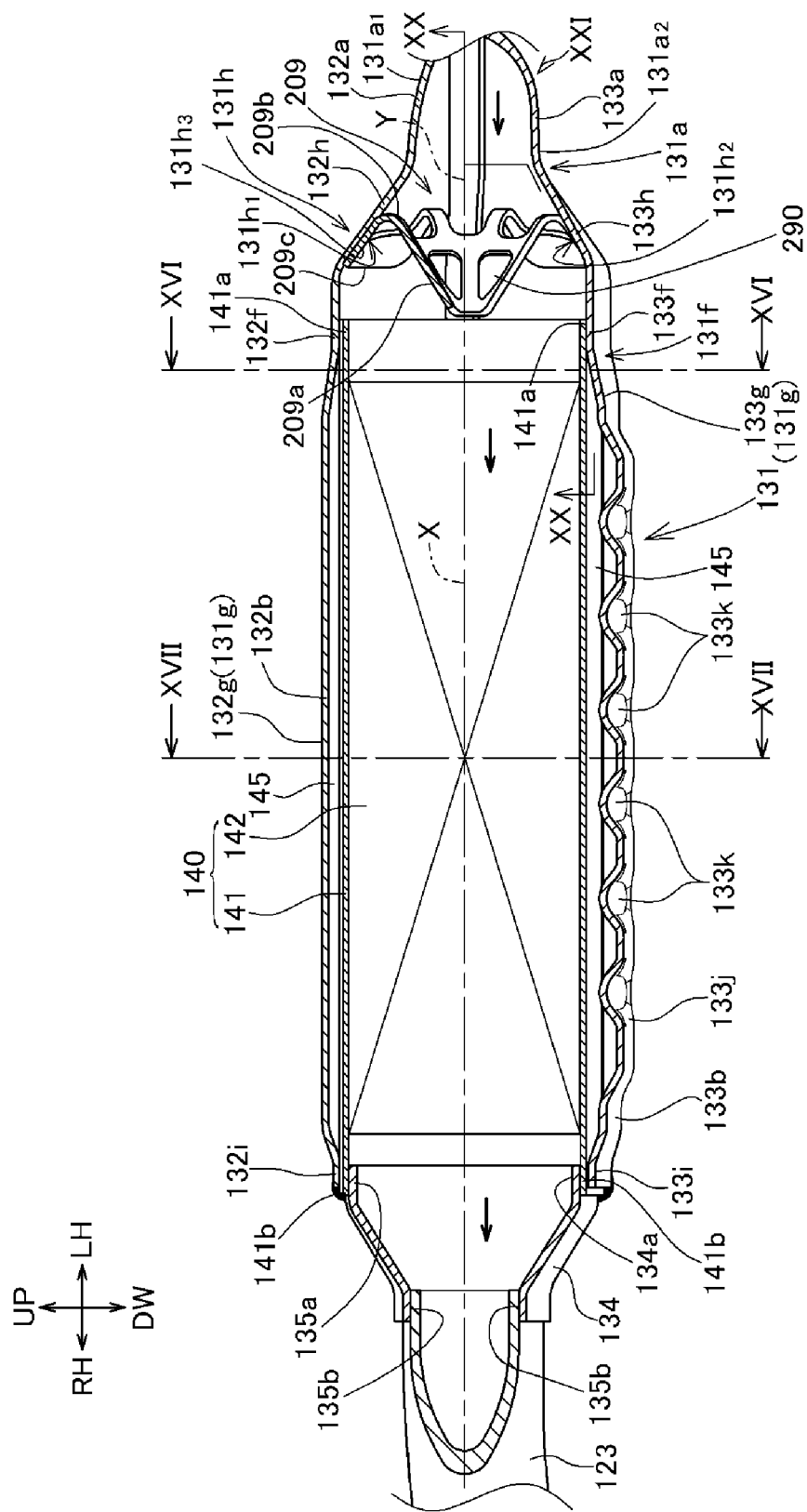
FIG. 14 is a sectional view taken along arrows XIV-XIV of FIG. 12.
Figure 15:
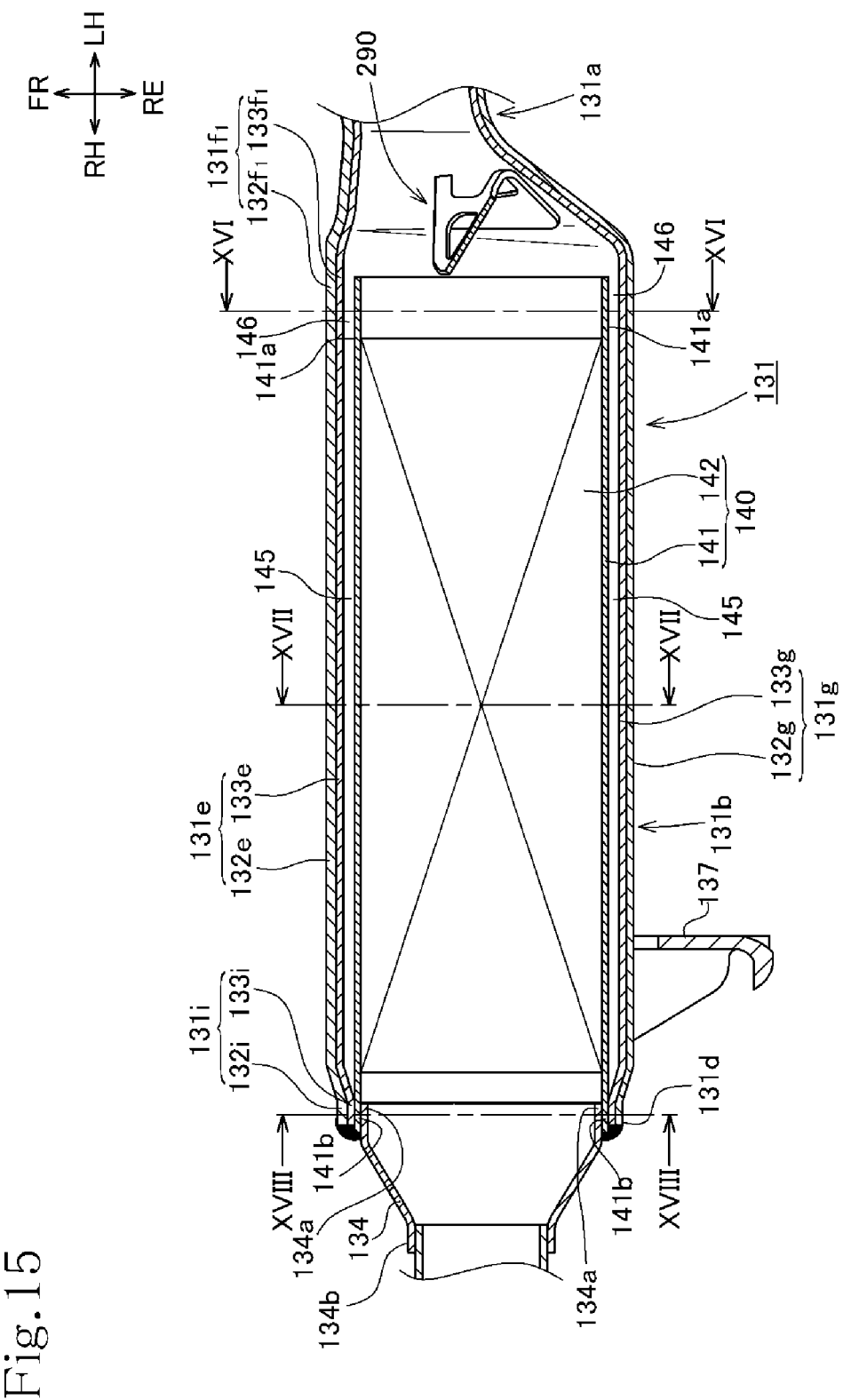
FIG. 15 is a sectional view taken along arrows XV-XV of FIG. 13.

The catalyst device 140 is accommodated in the catalyst case section 131b of the catalyst device accommodating exhaust pipe 131. As illustrated in FIGS. 14 and 15, the catalyst device 140 includes a cylindrically shaped outer shell section 141 serving as an outer shell of the catalyst device 140, and a cylindrical catalyst 142 as a three-way catalyst composed of a ceramic honeycomb or the like housed in the outer shell section 141.

The catalyst 142 is a honeycomb-shaped porous structure having a multiplicity of thin holes extending along an axial direction thereof, and, for example, platinum, rhodium and palladium are supported thereon as a catalyst for decomposition of exhaust gas components.

The outer shell section 141, which is formed to be longer than the catalyst 142 in an exhaust gas flow direction, is formed to be longer than the catalyst 142 in the exhaust gas flow direction, and both end portions of the outer shell section 141 are an upstream-side holding section 141a and a downstream-side holding section 141b inside which the catalyst 142 is not disposed.

As illustrated in FIG. 12, an upstream end portion 123a of the downstream-side exhaust pipe 123 is connected to a downstream end portion 134b of the connection pipe 134 connected to the downstream end portion 131d of the catalyst device accommodating exhaust pipe 131. As depicted in FIG. 6, the downstream-side exhaust pipe 123 is formed to extend leftward more than the catalyst device accommodating exhaust pipe 131 and to be further curved toward the rear side. As illustrated in FIG. 1, the downstream-side exhaust pipe 123 extends to the muffler 37 located in the vicinity of the rear wheel 3, and its downstream end portion 123b is attached to a front surface of the muffler 37 such as to communicate with the inside of the muffler 37.

The exhaust gas discharged from the engine 30 passes through the exhaust port 30c, the upstream-side exhaust pipe 122 and the catalyst device accommodating exhaust pipe 131, is clarified by the catalyst device 140, and is then discharged into the atmospheric air by passing through the downstream-side exhaust pipe 123 and the muffler 37.

As illustrated in FIG. 13, the catalyst device accommodating exhaust pipe 131 is of a so-called Monaka (bean-jam-filled wafers) structure (hollow structure) in which bisected members split along the exhaust gas flow direction are united with each other. The split bisected members are bisected to upper and lower portions, and includes an upper half 132 as a first half, and a lower half 133 as a second half. While the catalyst device accommodating exhaust pipe 131 is bisected into upper and lower portions in the present embodiment, it need only be bisected along the flow direction of the exhaust gas, and may be bisected into left and right portions, or may be bisected in other direction. The upper half 132 and the lower half 133 are mated with each other to constitute the catalyst device accommodating exhaust pipe 131. The exhaust pipe section 131a of the catalyst device accommodating exhaust pipe 131 includes an exhaust pipe section 132a of the upper half 132 and an exhaust pipe section 133a of the lower half 133, and the catalyst case section 131b includes a catalyst case section 132b of the upper half 132 and a catalyst case section 133b of the lower half.

As depicted in FIGS. 14, 15, 17 and 18, the catalyst case sections 132b and 133b of the upper half 132 and the lower half 133 have case sections 132g and 133g larger in diameter than the outside diameter of the outer shell section 141 of the catalyst device 140, and reduced diameter sections 132f and 133f and reduced diameter sections 132i and 133i which are provided respectively at upstream ends and downstream ends of the case sections 132g and 133g and which are reduced in diameter as compared to the case sections 132g and 133g. The case sections 132g and 133g and the outer shell section 141 of the catalyst device 140 are spaced from each other by a gap 145 therebetween such as not to make contact with each other.

Figure 16:
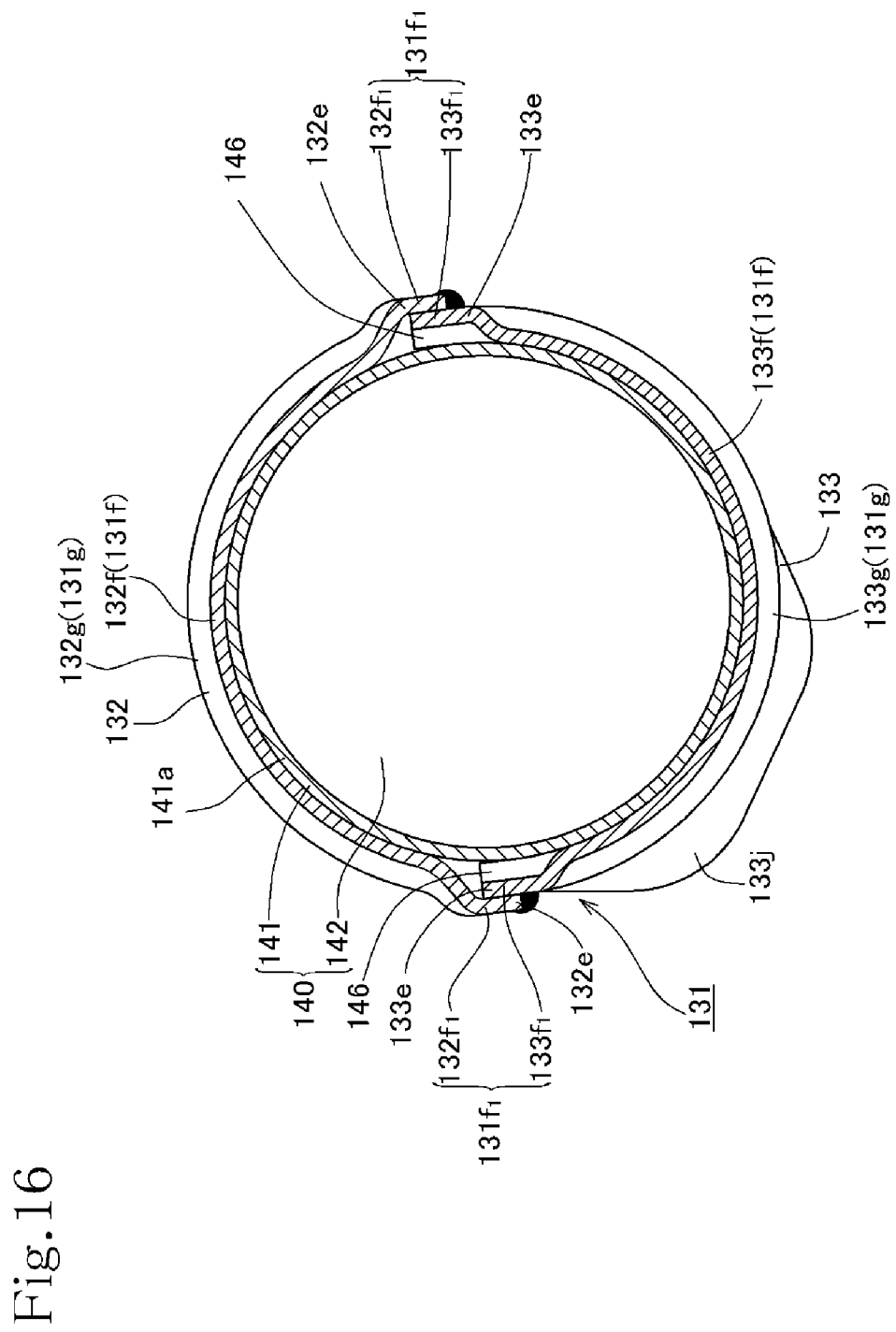
FIG. 16 is a sectional view taken along arrows XVI-XVI of FIG. 14, in a state in which the exhaust-device-side stay is removed.
Figure 17:
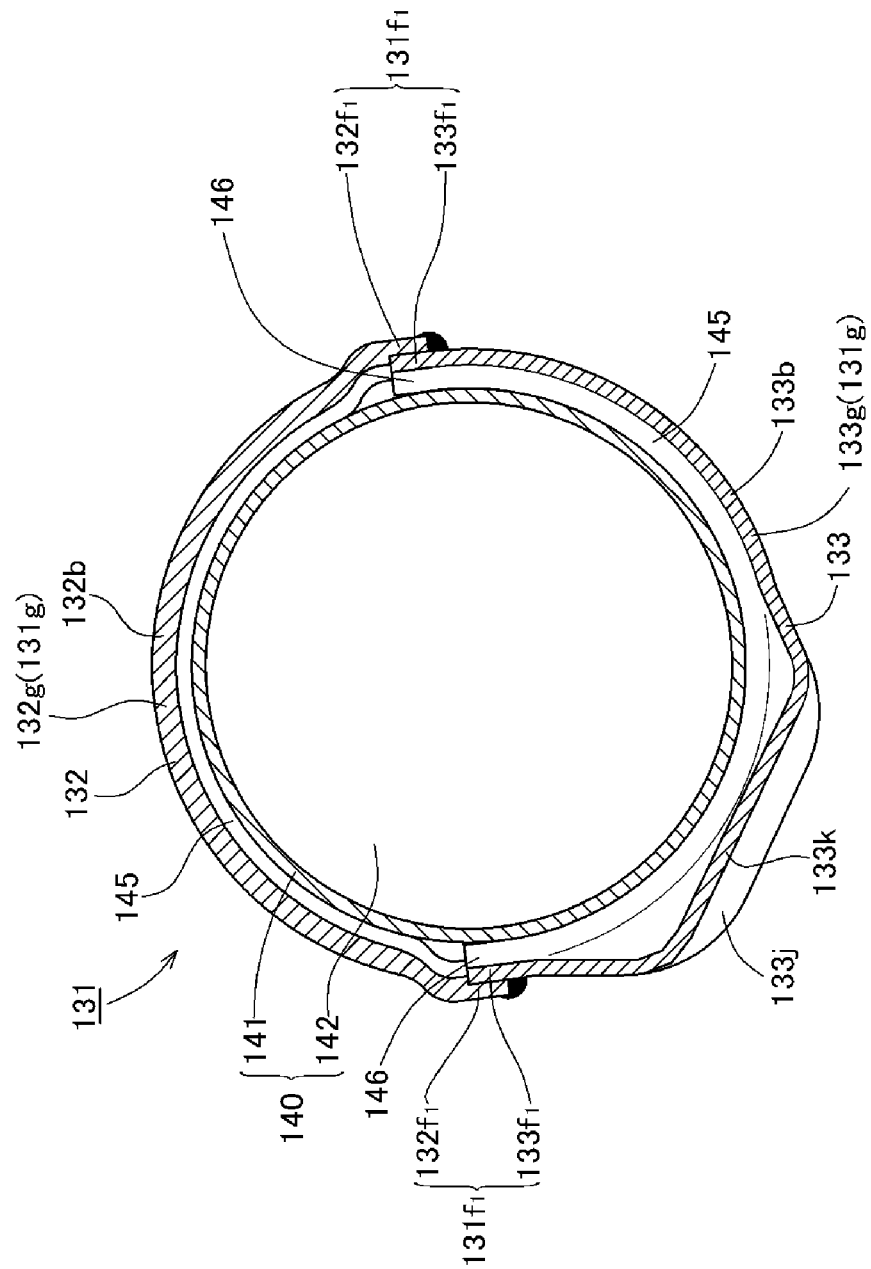
FIG. 17 is a sectional view taken along arrows XVII-XVII of FIG. 14, in a state in which the exhaust-device-side stay is removed.
Figure 18:
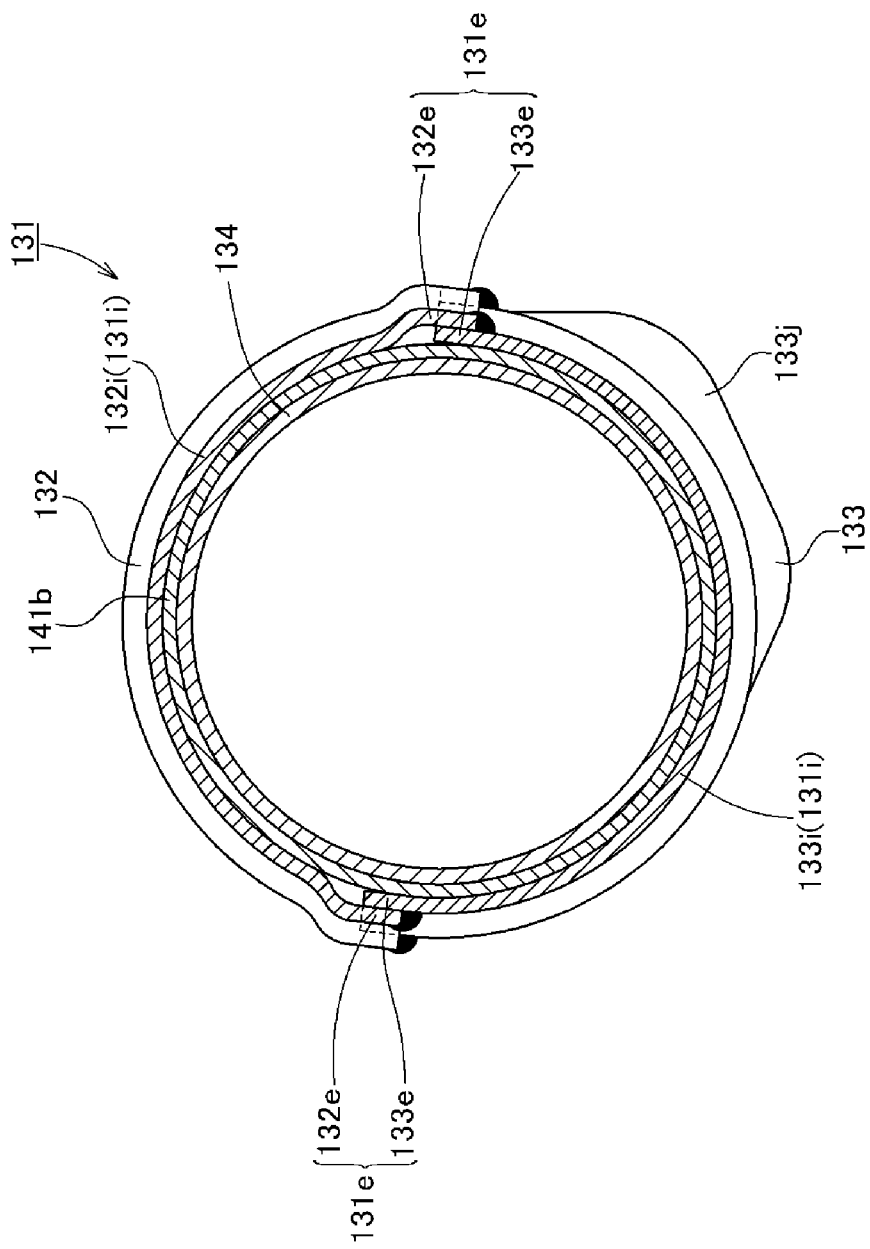
FIG. 18 is a sectional view taken alone arrows XVIII-XVIII of FIG. 14, in a state in which the exhaust-device-side stay is removed.

As illustrated in FIGS. 13, 16 and 18, left and right lower portions of the upper half 132 are joint edge sections 132e to be mated with the lower half 133. Left and right upper portions of the lower half 133 are joint edge sections 133e to be mated with the upper half 132. The joint edge section 133e of the lower half 133 is substantially equal in diameter to the case section 133g of the lower half 133 as depicted in FIG. 17. The joint edge section 132e of the upper half 132 is enlarged in diameter as compared to the case section 132g of the upper half 132, and is enlarged in diameter as compared to the joint edge section 133e of the lower half 133, such that the joint edge section 133e of the lower half 133 is fitted thereto. The joint edge sections 133e of the lower half 133 are fitted and welded to the inside of the joint edge sections 132e of the upper half 132, whereby the upper half 132 and the lower half 133 the connection pipe 134 are united.

While the joint edge sections 132e of the upper half 132 are enlarged in diameter as compared to the joint edge sections 133e of the lower half 133 in the present embodiment, the joint edge sections 133e of the lower half 133 may be enlarged in diameter as compared to the joint edge sections 132e of the upper half 132, and the upper half 132 may be fitted and welded to the lower half 133. In addition, the joining of the joint edge sections 133e of the lower half 133 and the joint edge sections 132e of the upper half 132 may be made between end portions of the lower half 133 and the upper half 132, or may be made between portions in the vicinity of the end portions.

As illustrated in FIGS. 6, 14 and 17, the case section 133g of the lower half 133 is provided with a bulging section 133j bulging outward more than the case section 133g, and the bulging section 133j is formed with a plurality of recesses 133k hollowed in a substantially elliptic shape which are aligned in the exhaust gas flow direction. Since the catalyst device 140 is guarded by the bulging section 133j and the recesses 133k, the catalyst device 140 can be protected from external factors from below the saddle riding vehicle 1.

As depicted in FIGS. 14 and 16, the reduced diameter section 132f provided at the upstream end side of the catalyst case section 132b of the upper half 132 is reduced in inside diameter as compared to the case sections 132g and 133g over substantially the whole circumference exclusive of the joint edge sections 132e at both left and right ends, such as to make contact with a half circumferential surface on the upper side of the upstream-side holding section 141a of the outer shell section 141 of the catalyst device 140. Specifically, the reduced diameter section 132f formed on the radial directionally inner side in relation to the enlarged diameter section $132f_1$ makes contact with the outer shell section 141 of the catalyst device 140, whereby the catalyst device 140 is held by the catalyst case section 132b.

As illustrated in FIGS. 14 and 16, the reduced diameter section 133f provided on the upstream end side of the catalyst case section 133b of the lower half 133 is reduced in inside diameter as compared to the case section 133g over substantially the whole circumference exclusive of the joint edge sections 133e at both left and right ends, such as to make contact with a half circumferential surface on the lower side of the upstream-side holding section 141a of the outer shell section 141 of the catalyst device 140. Specifically, the reduced diameter section 133f formed on the radial directionally inner side in relation to the enlarged diameter section $133f_1$ makes contact with the outer shell section 141 of the catalyst device 140, whereby the catalyst device 140 is held by the catalyst case section 133b.

As depicted in FIGS. 15 and 16, the joint edge sections 132e and 133e of the upper half 132 and the lower half 133 at the same section as the reduced diameter sections 132f and 133f on the upstream side in the case of cutting perpendicularly to the splitting direction of the catalyst device accommodating exhaust pipe 131 are not reduced in diameter but are the enlarged diameter sections $132f_1$ and $133f_2$ larger than the outside diameter of the outer shell section 141 of the catalyst device 140, and are spaced from the upstream-side holding section 141a of the outer shell section 141 of the catalyst device 140 by a gap 146 therebetween, such as not to make contact with each other.

As illustrated in FIGS. 14, 15 and 18, the reduced diameter section 133i provided on the downstream end side of the catalyst case section 133b of the lower half 133 is reduced in inside diameter as compared to the case section 133g over the whole circumference inclusive of the joint edge sections 133e at both left and right ends, such as to make contact with a half circumferential surface on the lower side of the downstream-side holding section 141b of the outer shell section 141 of the catalyst device 140.

As depicted in FIGS. 14, 15 and 18, the reduced diameter section 132i provided on the downstream end side of the catalyst case section 132b of the upper half 132 is reduced in inside diameter as compared to the case section 132g over substantially the whole circumference exclusive of the joint edge sections 132e at both left and right ends, and the part exclusive of the joint edge sections 132e at both left and right ends is formed such as to make contact with a half circumferential surface on the lower side of the downstream-side holding section 141b of the outer shell section 141 of the catalyst device 140. The joint edge sections 132e on both left and right sides are slightly enlarged in diameter such that the joint edge sections 133e of the lower half 133 are fitted therein.

Figure 10:
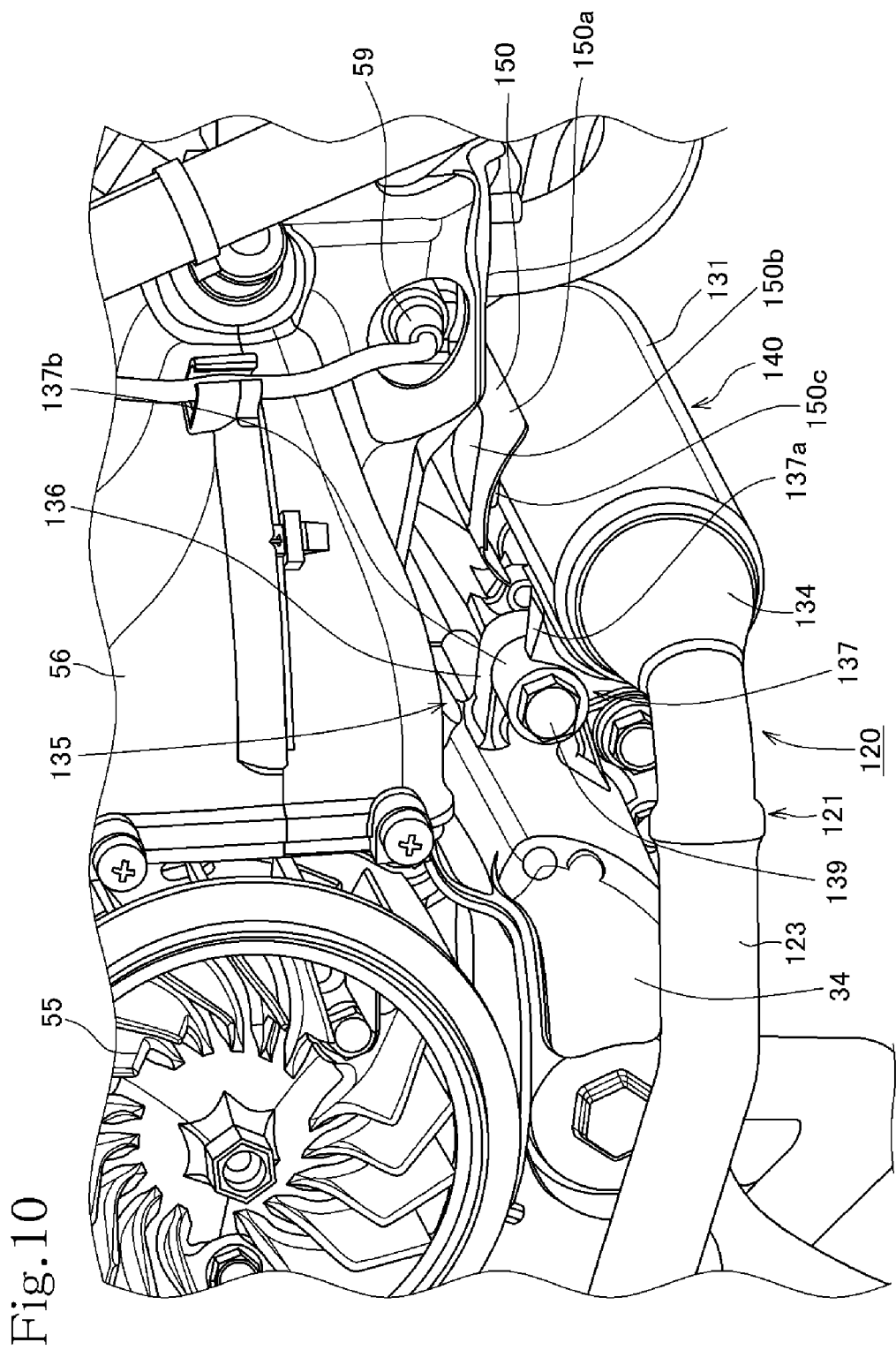
FIG. 10 is a perspective view, as viewed from an oblique right upper side, of the peripheral part around the unit swing engine.

As illustrated in FIGS. 10, 11 and 12, a heat shield plate 150 for preventing heat from the engine 30 from being excessively transmitted to the catalyst device 140 is attached to an upper surface of the catalyst device accommodating exhaust pipe 131. The heat shield plate 150 has a plate-shaped section 150a formed in a curved shape along an outer peripheral surface of the catalyst device accommodating exhaust pipe 131. The heat shield plate 150 is formed with two elliptic recesses 150b, and bottom surfaces 150c of the recesses 150b are fused to an upper surface of the catalyst device accommodating exhaust pipe 131, such that the area of contact between the heat shield plate 150 and the catalyst device accommodating exhaust pipe 131 is reduced.

As depicted in FIG. 15, the connection pipe 134 connected between the catalyst device accommodating exhaust pipe 131 and the downstream-side exhaust pipe 123 is formed to be narrowed in sectional area in a direction from the upstream end portion 134a connected to the downstream end portion 131d of the catalyst device accommodating exhaust pipe 131 toward the downstream end portion 134b connected to the downstream-side exhaust pipe 123, by drawing or winding.

The catalyst device accommodating exhaust pipe 131 configured as above is assembled as follows. The upstream-side holding section 141a of the outer shell section 141 of the catalyst device 140 is held by the reduced diameter sections 132f and 133f on the upstream side, with the upper half 132 and the lower half 133 of the catalyst device 140 interposed therebetween, the downstream-side holding section 141b of the outer shell section 141 is held by the reduced diameter sections 132i and 133i on the downstream side, and the joint edge sections 132e of the upper half 132 and the joint edge sections 133e of the lower half 133 are welded to each other, thereby uniting the upper half 132 and the lower half 133. Even when the joint edge sections 132e of the upper half 132 and the joint edge sections 133e of the lower half 133 are welded to each other, the structure in which the joint edge sections 132e and 133e at the same sections as the reduced diameter sections 132f and 133f are made to be enlarged diameter sections $132f_1$ and $133f_1$ larger than the outside diameter of the outer shell section 141 of the catalyst device 140 ensures that a gap is generated between the enlarged diameter sections $132f_1$ and $133f_1$ and the outer shell section 141 of the catalyst device 140, as depicted in FIG. 16, so that the catalyst device 140 is prevented from being fused together with the catalyst device accommodating exhaust pipe 131.

Further, as illustrated in FIGS. 14 and 15, the upstream end portion 134a of the connection pipe 134 is fitted into the inside of the downstream-side holding section 141b of the outer shell section 141 of the catalyst device 140, from the downstream end portion 131d of the catalyst device accommodating exhaust pipe 131, and the downstream end portion 131d of the catalyst device accommodating exhaust pipe 131, the downstream-side holding section 141b of the outer shell section 141 of the catalyst device 140 and the upstream end portion 134a of the connection pipe 134 are fused together by a so-called three plate welding method.

As depicted in FIG. 14, a diffusion member 209 for causing uniform collision of the exhaust gas on the catalyst 142 is provided inside the catalyst device accommodating exhaust pipe 131. The diffusion member 209 is disposed in the inside of the connection section 131h of the catalyst device accommodating exhaust pipe 131 at a position upstream of the catalyst 142.

Figure 19:
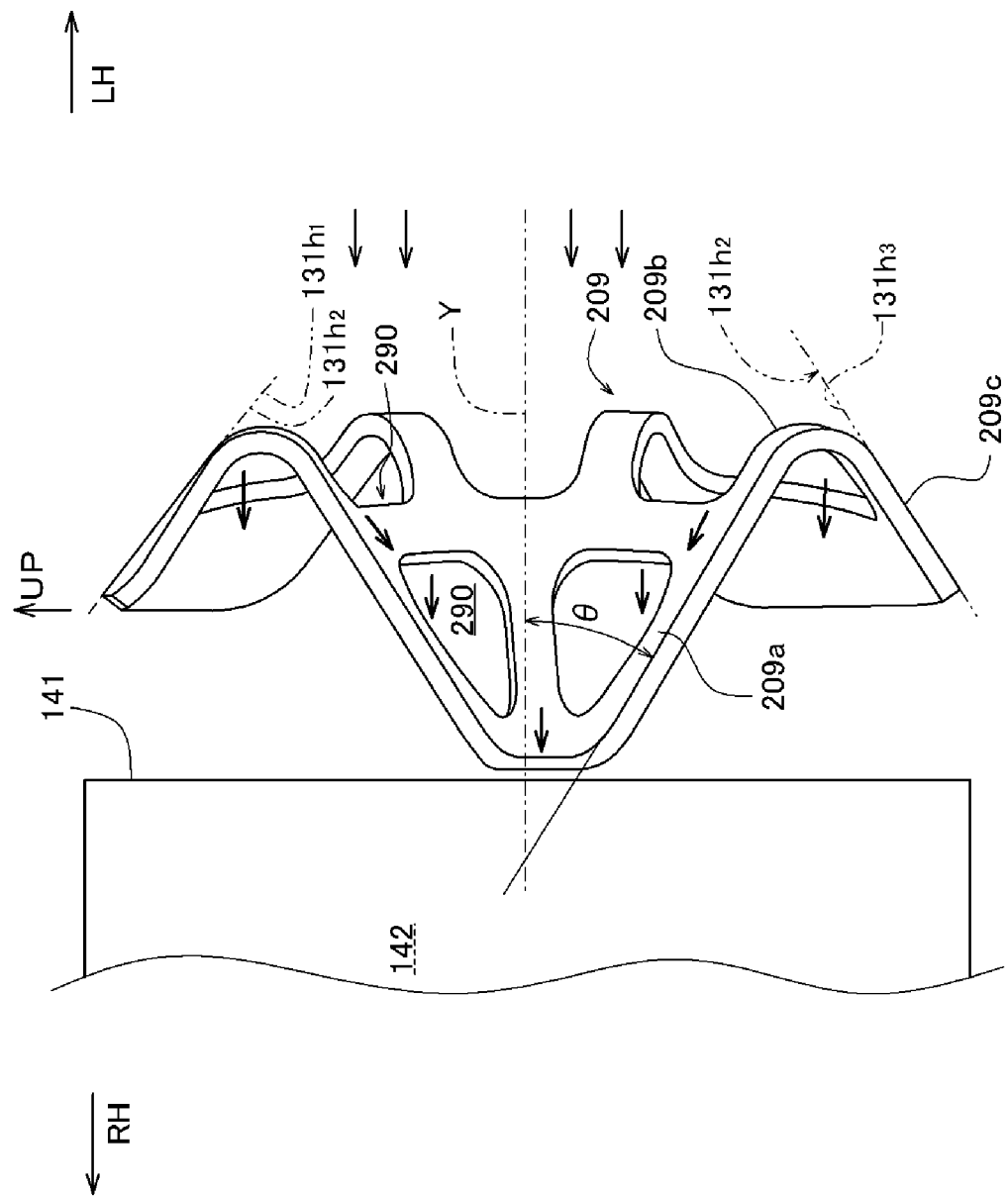
FIG. 19 is an illustration depicting by taking out an outer shell section and a diffusion member of a catalyst device, in a substantially the same orientation as FIG. 14.

FIG. 19 depicts, in a picking-up manner, the outer shell section 141 and the diffusion member 209, in substantially the same orientation as in FIG. 14.

As illustrated in FIGS. 14 and 19, the diffusion member 209 is disposed on a curving directionally outer side of a center axis Y of a downstream end $131a_2$ of the exhaust pipe curved section 131$a_1$ of the exhaust pipe section 131$a$ of the catalyst device accommodating exhaust pipe 131, over a range from an inner periphery upper portion 131$h_1$ a to an inner periphery lower portion 131$h_2$ of the connection section 131$h$. As depicted in FIG. 19, the diffusion member 209 includes s straightening vane 209$a$ which is inclined toward the center side of the catalyst 142 at an acute angle θ relative to the center axis Y, and faces toward the curving directionally inner side in the manner of opposing the flow of the exhaust gas.

An upstream-side peripheral edge 209$b$ of the straightening vane 209$a$ is turned back to an outer peripheral side downstream direction, and includes outer peripheral edge sections 209$c$ in the periphery. As depicted in FIG. 14, the outer peripheral edge section 209$c$ is formed along an inner peripheral surface 131$h_3$ of the connection section 131$h$ of the catalyst device accommodating exhaust pipe 131.

Specifically, the outer peripheral edge section 209$c$ has a conical shape coincident with the inner peripheral surface 131$h_3$ of the connection section 131$h$, and is attached to the inner peripheral surface 131$h_3$ by welding or the like as depicted in FIGS. 14 and 19, whereby the diffusion member 209 is attached and fixed inside the catalyst device accommodating exhaust pipe 131.

Therefore, the diffusion member 209 can be simply and easily disposed in a space on the upstream side of the catalyst 142 connected to the exhaust pipe section 131$a$ of the catalyst device accommodating exhaust pipe 131, or in a suitable layout in conformity with the connection section 131$h$ of the catalyst device accommodating exhaust pipe 131, and an exhaust gas diffusing effect can be enhanced for the catalyst 142.

The one straightening vane 209$a$ is formed toward the center side of the connection section 131$h$, the two outer peripheral edge sections 209$c$ are provided to face the periphery, communication openings 290 providing communication between the upstream side and the downstream side of the exhaust gas flow are provided at two positions in the upstream-side peripheral edge 209$b$ ranging from the straightening vane 209$a$ to the outer peripheral edge sections 209$c$, and communication openings 290 are similarly provided at two positions near the center on the downstream side of the straightening vane 209$a$.

Figure 20:
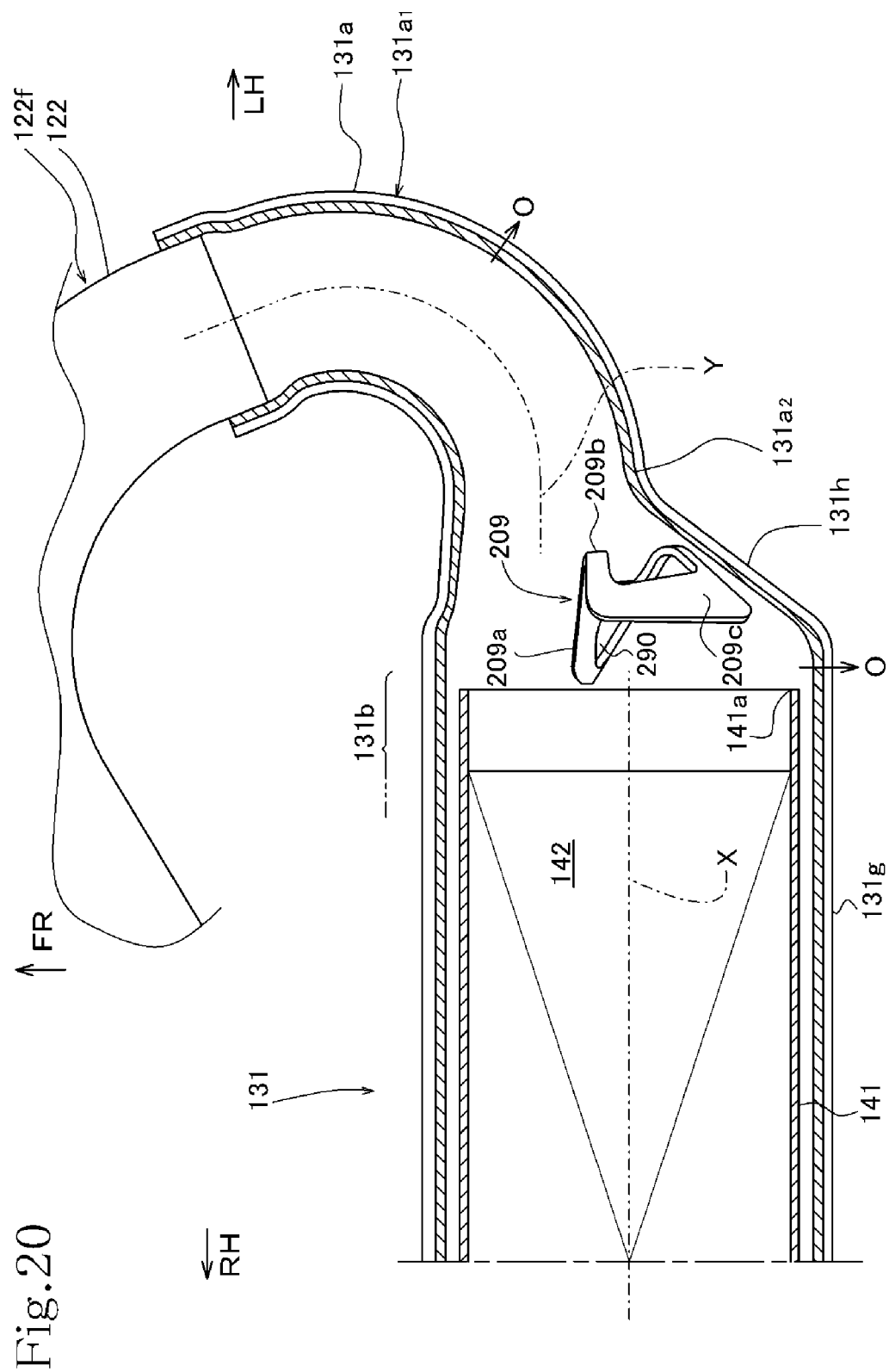
FIG. 20 is a bottom sectional view of the catalyst device accommodating exhaust pipe, taken substantially along arrows XX-XX of FIG. 14.

FIG. 20 is a bottom sectional view of the catalyst device accommodating exhaust pipe 131, taken substantially along arrows XX-XX of FIG. 14, in which the diffusion member 209 and the upstream-side exhaust pipe 122 are not depicted in section, and the positional relations between the exhaust pipe section 131$a$, the diffusion member 209 and the catalyst 142 are illustrated with reference to the curving direction of the upstream-side exhaust pipe 122 and the exhaust pipe section 131$a$.

Figure 21:
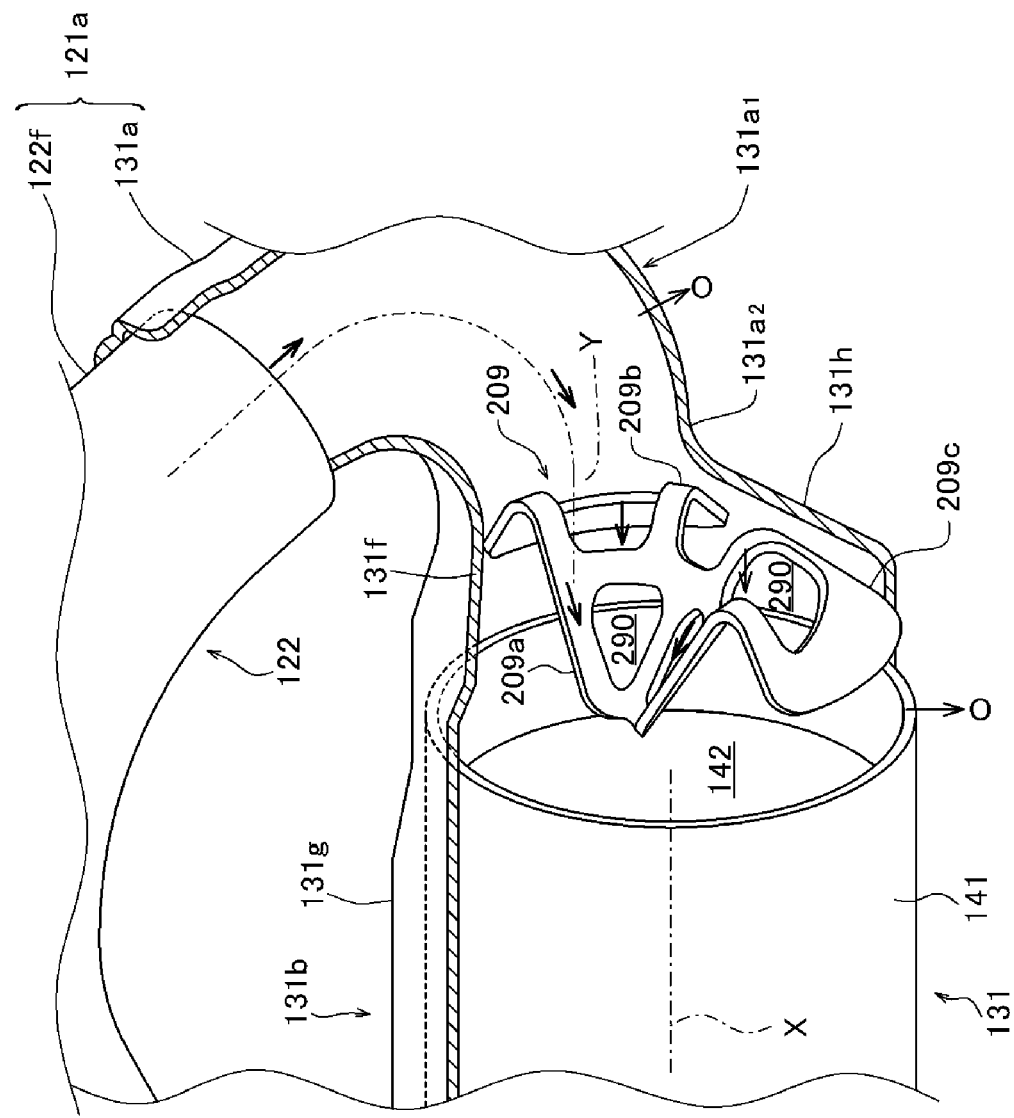
FIG. 21 is a bottom sectional view of the catalyst device accommodating exhaust pipe, taken substantially along arrows XXI-XXI of FIG. 14.

In addition, FIG. 21 is a partly sectional bottom perspective view of the part depicted in FIG. 20, taken substantially along arrow XXI of FIG. 14.

As illustrated in FIGS. 20 and 21, the center axis of the catalyst 142, that is, the center axis X of the outer shell section 141 of the catalyst device accommodating exhaust pipe 131 is offset to the curving directionally outer side (arrow O in the drawing) with reference to the center axis Y of the downstream end 131$a_2$ of the exhaust pipe section curved section 131$a_1$ of the exhaust pipe section 131$a$.

Besides, the diffusion member 209 is also offset to the curving directionally outer side (arrow O in the drawing) with reference to the center axis Y.

Therefore, the exhaust gas having flowed in a partialized manner near the curving directionally outer side by passing through the curved section 122$f$ of the upstream-side exhaust pipe 122 and the exhaust pipe curved section 131$a_1$ of the exhaust pipe section 131$a$ collides on the straightening vane 209$a$ of the diffusion member 209 that is offset to the curving directionally outer side, and part of the exhaust gas is guided to the center direction of the catalyst 142, or toward the curving directionally inner side.

On the other hand, the exhaust gas having passed through the communication openings 290 of the diffusion member 209 flows straight, but, since the center axis X of the catalyst 142 is offset to the curving directionally outer side, the exhaust gas is prevented from being guided in a partialized manner to the catalyst 142 on the curving directionally outer side.

As depicted in FIGS. 10 and 11, the saddle riding vehicle 1 is provided with an exhaust device coupling section 135 for coupling the crankcase 34 and the exhaust device 120 and supporting the exhaust device 120 on the crankcase 34. The exhaust device coupling section 135 is configured by coupling between a crankcase-side stay 136 extending forward at a front surface of the crankcase 34 of the unit swing engine 13 and an exhaust-device-side stay 137 extending rearward on the downstream side of the catalyst device accommodating exhaust pipe 131. As illustrated in FIGS. 5 and 10, the crankcase-side stay 136 and the exhaust-device-side stay 137 are disposed in the state of being offset in the transverse direction, and the crankcase-side stay 136 and the exhaust-device-side stay 137 are overlapped and coupled with each other in the transverse direction.

The crankcase-side stay 136 is projected while extending forward at a lower portion of the crankcase 34, and is formed, at the center of a tip thereof, with a bolt passing hole, though not illustrated.

As depicted in FIGS. 10 and 12, the exhaust-device-side stay 137 is attached by welding to a rear surface on the downstream side of the catalyst device accommodating exhaust pipe 131. As illustrated in FIG. 10, the exhaust-device-side stay 137 has a structure in which a cylindrically shaped attachment member 137$b$ is firmly attached to a support member 137$a$ which is roughly triangular in side view, and the attachment member 127$b$ is formed in the center thereof with a bolt passing hole (not illustrated).

A bolt 139 as a fastening member is inserted in and passed through the bolt passing hole of the crankcase-side stay 136 and the bolt passing hole of the exhaust-device-side stay 137, and is fastened in screw engagement, whereby the exhaust device 120 is supported on the unit swing engine 13.

Since the exhaust device 120 is supported on the unit swing engine 13 by the exhaust device coupling section 135 as depicted in FIG. 10, the catalyst device 140 accommodated in the catalyst device accommodating exhaust pipe 131 of the exhaust device 120 is disposed as follows.

As illustrated in FIG. 4, the catalyst device 140 is disposed in a space R which is located on the front side of the front end 34$a$ of the crankcase 34 and on the lower side of the cylinder section 35. The catalyst device 140 is disposed in the space R substantially horizontally, with its axis 140$a$ oriented in the transverse direction, that is, with its axis 140$a$ oriented substantially orthogonally to the imaginary line C passing through the crankcase split surface CS in bottom view. In other words, the axis 140$a$ of the catalyst device 140 is substantially parallel to the crankshaft 33. The catalyst 142 is disposed coaxially with the axis 140$a$ parallel to the crankshaft 33. In other words, the catalyst 142 is disposed on the axis 140$a$ parallel to the crankshaft 33, with its longitudinal direction disposed in the transverse direction.

While the catalyst device 140 is disposed with its axis 140a substantially in parallel to the crankshaft 33 in the present embodiment, the axis 140a may not necessarily be disposed perfectly in parallel to the crankshaft 33, insofar as the axis 104a is disposed substantially in the transverse direction. For example, if the axis 140a is directed substantially in the transverse direction, the catalyst device 140 may be disposed with its axis 140a being not horizontal but inclined.

Specifically, the catalyst device 140 is disposed on the front side of the front end 34a of the crankcase 34 and on the rear side of the exhaust pipe connection section 35e of the cylinder head 35b. In addition, the catalyst device 140 is located on the upper side of a lower surface of a front end portion of an oil pan section 34b and on the lower side of lower surfaces of the cylinder block 35a and the cylinder head 35b. Further, the catalyst device 140 is located on the lower side of the enlarged width sections 21a of the seat frames 20, and, as depicted in FIG. 5, is located between transverse directionally outer end portions 21b of the left and right enlarged width sections 21a, in the transverse direction. In addition, as depicted in FIG. 1, the catalyst device 140 is disposed above a straight line form imaginary line U1 connecting a lower end of the under cover 48 located at a rear portion of the under cover 48 and a lower end of the crankcase 34 of the unit swing engine 13.

The catalyst device 140 is disposed between the upstream-side exhaust pipe 122 and the front end 34a of the crankcase 34. In addition, the catalyst device 140 is disposed with an offset in the transverse direction, such that the longitudinal directional center line 140b in the transverse direction thereof is located on transverse directionally one side, or on the side where the muffler 37 is located, with reference to the imaginary line C passing through the crankcase split surface CS of the saddle riding vehicle 1.

The catalyst device 140 is located on the transverse directionally inner side as compared to the enlarged width section 21a of the seat frame 20 on transverse directionally one side.

In addition, as depicted in FIG. 4, the catalyst device 140 is disposed in a region between the imaginary line L1 that connects the pivot shaft 39 coupling the link member 38 to the engine brackets 28 and the front end 34a of the crankcase 34 and the imaginary line L2 that connects the exhaust pipe connection section 35e of the cylinder head 35b connected with the upstream end of the upstream-side exhaust pipe 122 of the exhaust device 120 and the pivot shaft 39. Here, the imaginary line L2 is disposed such as to pass through the front end of the exhaust pipe connection section 35e.

Further, from other point of view, the catalyst device 140 is disposed on the front side of the front end 34a of the crankcase 34 at such a position that at least part thereof overlaps with the cylinder section 35 in plan view.

Since the link member 38 is disposed on the upper side of the crankcase 34 in this first embodiment, a space can be secured in a region which is on the lower side of the cylinder section 35 and between the imaginary line L1 and the imaginary line L2, and the catalyst device 140 can be disposed in the space. Therefore, the catalyst device 140 can be disposed in a compact fashion such that the catalyst device 140 does not collide on other parts in the periphery of the catalyst device 140.

More specifically, since the catalyst device 140 is disposed between the exhaust pipe connection section 35e of the cylinder head 35b and the front end 34a of the crankcase 34, the catalyst device 140 can be disposed in a compact fashion by effectively utilizing the space between the upstream-side exhaust pipe 122 and the front end 34a while securing a disposing space for the upstream-side exhaust pipe 122 extending from the exhaust pipe connection section 35e.

In addition, since the exhaust device 120 includes the side extension section 122e and the curved section 122f and is turned back after extending in the transverse direction toward the side opposite to the muffler 37 and is connected to the catalyst device 140, the pipe length of the upstream-side exhaust pipe 122 can be secured to be long, and the upstream-side exhaust pipe 122 can be made long according to the required characteristics of the engine 30.

Further, since the catalyst device 140 has its longitudinal directional center line 140b in the transverse direction offset to the muffler 37 side as compared to the imaginary line C vehicle passing through the crankcase split surface CS of the saddle riding vehicle 1, the pipe length of the upstream-side exhaust pipe 122 can be secured to be long.

The downstream-side exhaust pipe 123 includes a bent section 62a bent rearward after extending toward transverse directionally one side from one side end 63b of the catalyst device 140, and a rear extension section 62b extending rearward from the bent section 62a and connected to a front end 37b of the muffler 37. The rear extension section 62b extends rearward by passing on the lower side of the fan cover 57. A second oxygen sensor 65 (oxygen sensor, FIG. 4) for detecting oxygen in the exhaust gas is attached to the downstream-side exhaust pipe 123. With the second oxygen sensor 65 thus provided on the downstream-side exhaust pipe 123 on the downstream side of the catalyst device 140, oxygen concentration of the exhaust gas having passed through the catalyst device 140 can be detected.

As illustrated in FIG. 4, the cylinder cover 58 of the shroud 56 is disposed while inclined forwardly upward in conformity with the axis 35d of the cylinder section 35, and a lower surface portion of the cylinder cover 58 is inclined such as to be located on the upper side in going from the position on the rear side of the catalyst device 140 toward the catalyst device 140.

That part of the lower surface portion of the cylinder cover 58 which faces the catalyst device 140 is formed with a relief section 58b recessed upward such as to avoid an upper surface of the catalyst device 140. The relief section 58b is located on the rear side of the exhaust pipe passing hole 58a. Since the distance between the catalyst device 140 and the cylinder cover 58 can be secured owing to the relief section 58b, even in the configuration in which the catalyst device 140 is provided on the lower side of the cylinder section 35, thermal influence of the catalyst device 140 on the cylinder cover 58 can be reduced.

Figure 7:
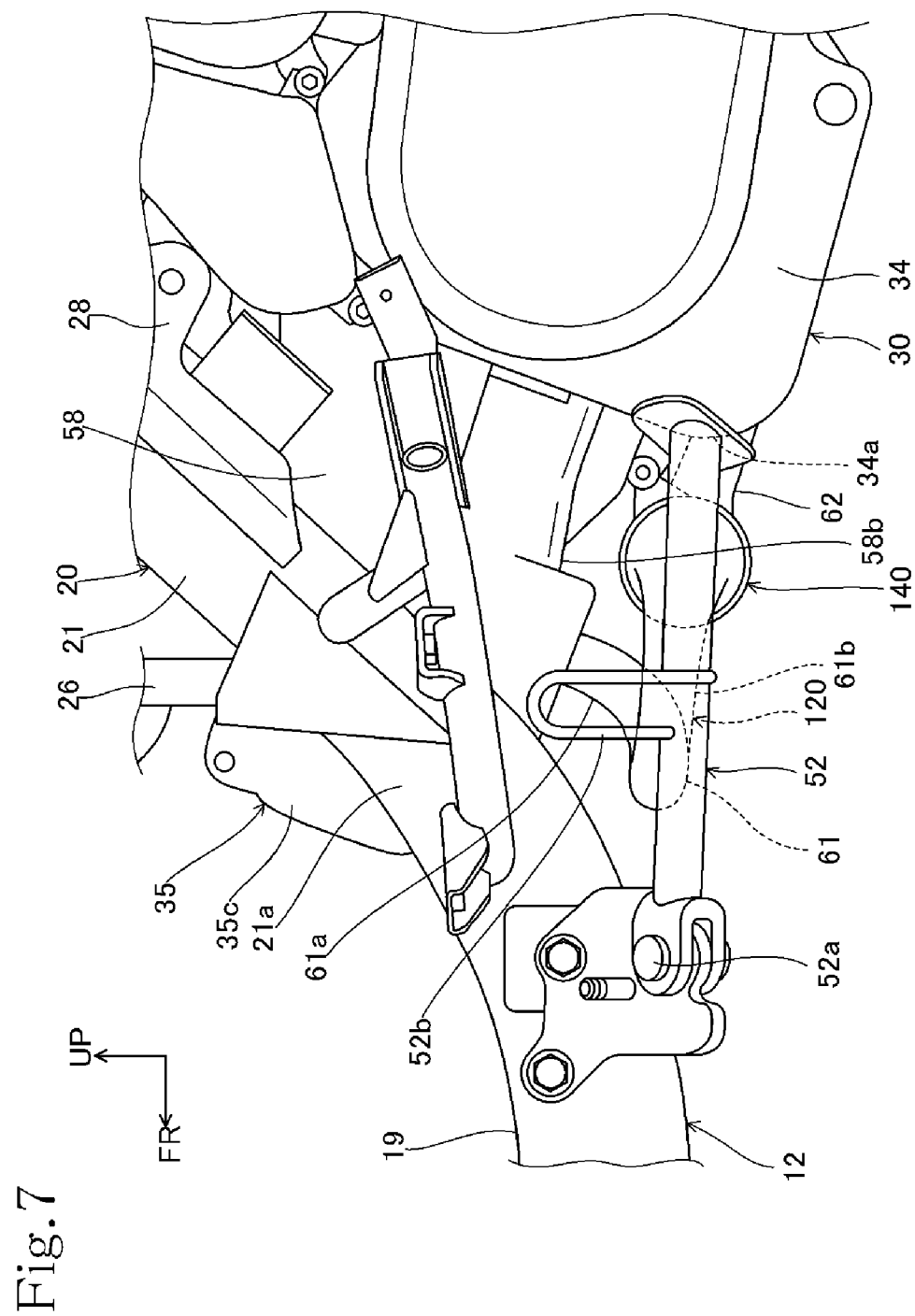
FIG. 7 is a left side view of a peripheral part around a side stand and a catalyst device.

FIG. 7 is a left side schematic view of a peripheral part around the side stand 52 and the catalyst device 140.

As illustrated in FIG. 7, in the case where the side stand 52 is rotated around the side stand rotating shaft 52a and the side stand 52 is put into a stored state, the rod-shaped side stand 52 extends in the longitudinal vehicle direction, and its most part exclusive of its front end portion overlaps with the upstream-side exhaust pipe 122 and the catalyst device 140 from the transverse directionally outer side. As a result, the upstream-side exhaust pipe 122 and the catalyst device 140 can be protected from a lateral side by the side stand 52, the upstream-side exhaust pipe 122 and the catalyst device accommodating exhaust pipe 131 can be made to be hard to visually recognize, whereby external appearance can be enhanced.

In addition, the side stand 52 includes an operation section 52b extending toward the transverse directionally outer side from an intermediate portion in the longitudinal vehicle direction in the stored state. An end portion on the transverse directionally outer side of the operation section 52b is bent and extends upward. The operation section 52b is a part operated by putting a foot thereon when the driver operates the side stand 52. In the stored state, the operation section 52b overlaps with the upstream-side exhaust pipe 122 from an outer side, and, therefore, the upstream-side exhaust pipe 122 can be made to be hard to visually recognize and the upstream-side exhaust pipe 122 can be protected, by the operation section 52b.

As depicted in FIG. 1, lower ends 51b of the center stand 51 in the case where the center stand 51 is in the stored state serve as reference points for minimum road clearance of the saddle riding vehicle 1. The lower ends 51b are located respectively on left and right sides relative to the rear wheel 3, and are each a part which first makes contact with the ground when the saddle riding vehicle 1 is banked to the left or the right.

The catalyst device 140 is disposed on the upper side relative to the lower ends 51b of the center stand 51. Therefore, even in the configuration where the catalyst device 140 is disposed on the lower side of the cylinder section 35, the catalyst device 140 can be disposed at a position sufficiently high in relation to the road surface.

As illustrated in FIGS. 4 to 6, the cross member 23 is disposed on the front side of the upstream-side exhaust pipe 122 and the catalyst device 140 and on the upper side of the upstream-side exhaust pipe 122 and the catalyst device 140, and a horizontal line H (FIG. 4) extending rearward from the lower end of the cross member 23 overlaps with an upper portion of the catalyst device 140. Further, the catalyst device 140 is located such as to overlap with the cross member 23 in the transverse direction. In other words, in front view, a lower portion of the cross member 23 overlaps with the upstream-side exhaust pipe 122 and the catalyst device 140 from the front side. Therefore, the upstream-side exhaust pipe 122 and the catalyst device 140 can be protected from the front side by the cross member 23.

A rear end portion of the step floor 11 is supported from below by the support frames 27. In addition, the support frames 27 support tandem steps 8 (FIG. 1) for the passenger seated on a rear portion of the seat 10. The left and right support frames 27 are located on the transverse directionally outer sides of the catalyst device 140 at positions such as to overlap with the catalyst device 140 in the longitudinal vehicle direction. Therefore, even in the case where the saddle riding vehicle 1 is in a state of being banked to a lateral side, the support frame 27 is grounded earlier than the catalyst device 140, whereby the catalyst device 140 can be effectively protected.

Figure 8:
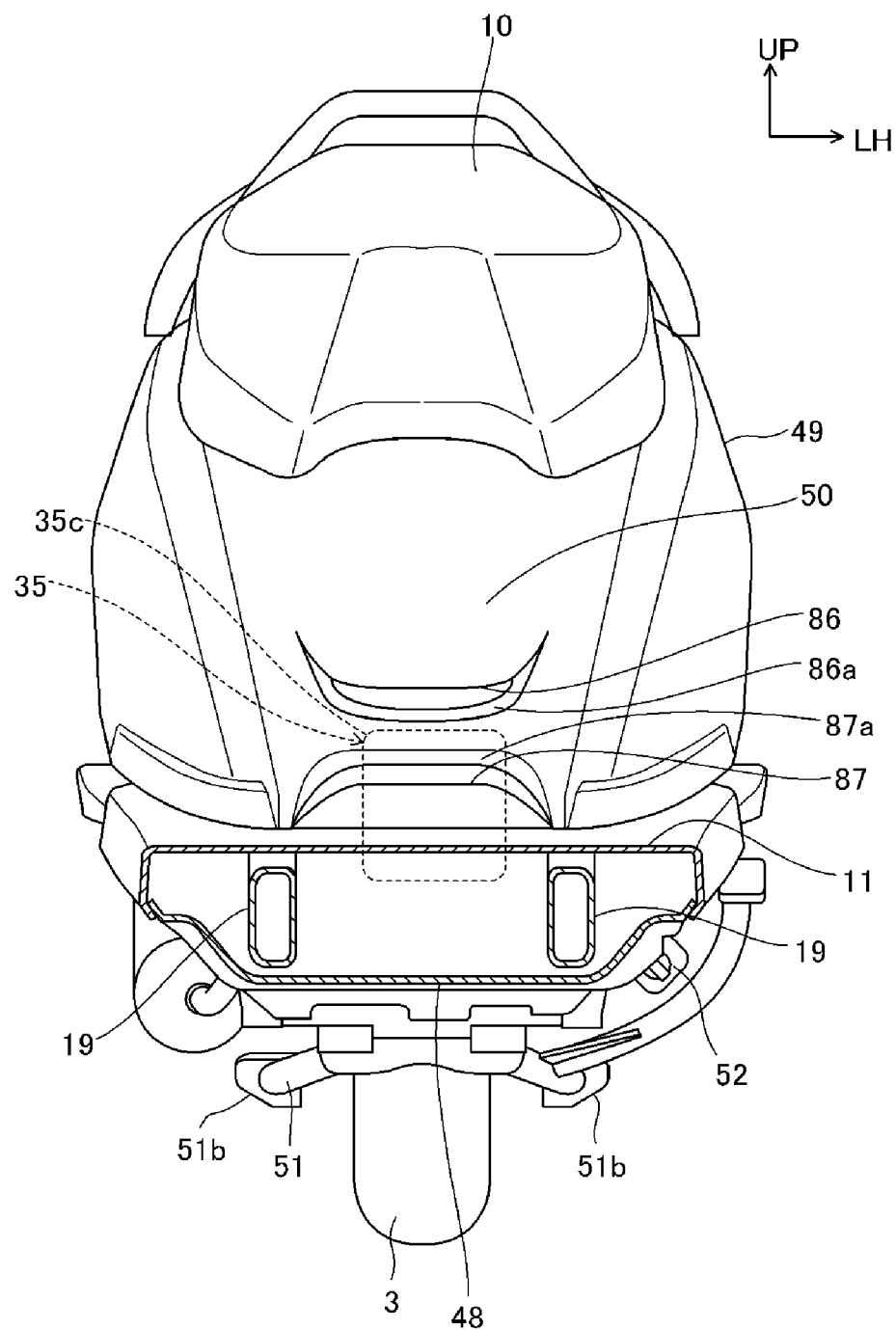
FIG. 8 is a sectional view taken along line VIII-VIII of FIG. 1.

FIG. 8 is a sectional view taken along line VIII-VIII of FIG. 1. Note that in FIG. 8, of the parts in a space between the step floor 11 and the under cover 48, only the lower frames 19 are illustrated, and the other parts are not illustrated.

As depicted in FIGS. 1 and 8, the center lower cover 50 on the lower side of the front end of the seat 10 is formed with an upper opening 86 and a lower opening 87 (opening) that penetrate the center lower cover 50.

The upper opening 86 is formed in the shape of a slit extending in the transverse direction, and is located on the front side of the cylinder section 35 and on the upper side of the cylinder section 35. The upper opening 86 includes a lower wall section 86a extending rearwardly upward from a lower edge of a peripheral edge section thereof.

Part of airflow induced by the traveling of the saddle riding vehicle 1 comes into the inside of the center lower cover 50 through the upper opening 86, flows rearwardly upward while being guided by the lower wall section 86a, and flows rearward along an upper surface of the unit swing engine 13, to be discharged to the exterior. By this airflow, dust and the like adhering to a peripheral part around the unit swing engine 13 can be blown away to the exterior.

The lower opening 87 is formed in the shape of a slit extending in the transverse direction, and is located on the lower side of the upper opening 86. As depicted in FIGS. 2 and 8, the lower opening 87 is located on the front side of the cylinder section 35 and below the upper end of the cylinder section 35 that is the uppermost end of the unit swing engine 13.

The lower opening 87 includes an upper wall section 87a extending rearwardly downward from an upper edge of a peripheral edge section thereof. The upper wall section 87a is inclined rearwardly downward such as to be oriented toward the catalyst device 140.

Part of the airflow inducted by the traveling of the saddle riding vehicle 1 comes into the inside of the center lower cover 50 through the lower opening 87, flows rearwardly downward while being guided by the upper wall section 87a, then flows rearward along a lower surface of the unit swing engine 13, and passes the surroundings of the catalyst device 140, to be thereafter discharged to the exterior. By this airflow, the catalyst device 140 can be effectively cooled.

As illustrated in FIG. 5, the cylinder cover 58 of the shroud 56 is formed in its lower surface with an air guide port 88 that guides cooling air generated by the cooling fan 55 to the catalyst device 140. The air guide port 88 is disposed at such a position as to overlap with the catalyst device 140 in bottom view, and is formed in continuity with the exhaust pipe passing hole 58a. Note that the air guide port 88 may be formed as a hole separate from the exhaust pipe passing hole 58a.

Cooling air taken into the inside of the shroud 56 through the air intake port 57a (FIG. 6) by driving of the cooling fan 55 passes within the shroud 56, thereby cooling the cylinder section 35, and is discharged through the exhaust pipe passing hole 58a and the air guide port 88. The cooling air discharged via the air guide port 88 impinges on the catalyst device 140, thereby cooling the catalyst device 140. Therefore, the catalyst device 140 can be effectively cooled by the cooling air induced by the cooling fan 55.

Figure 9:
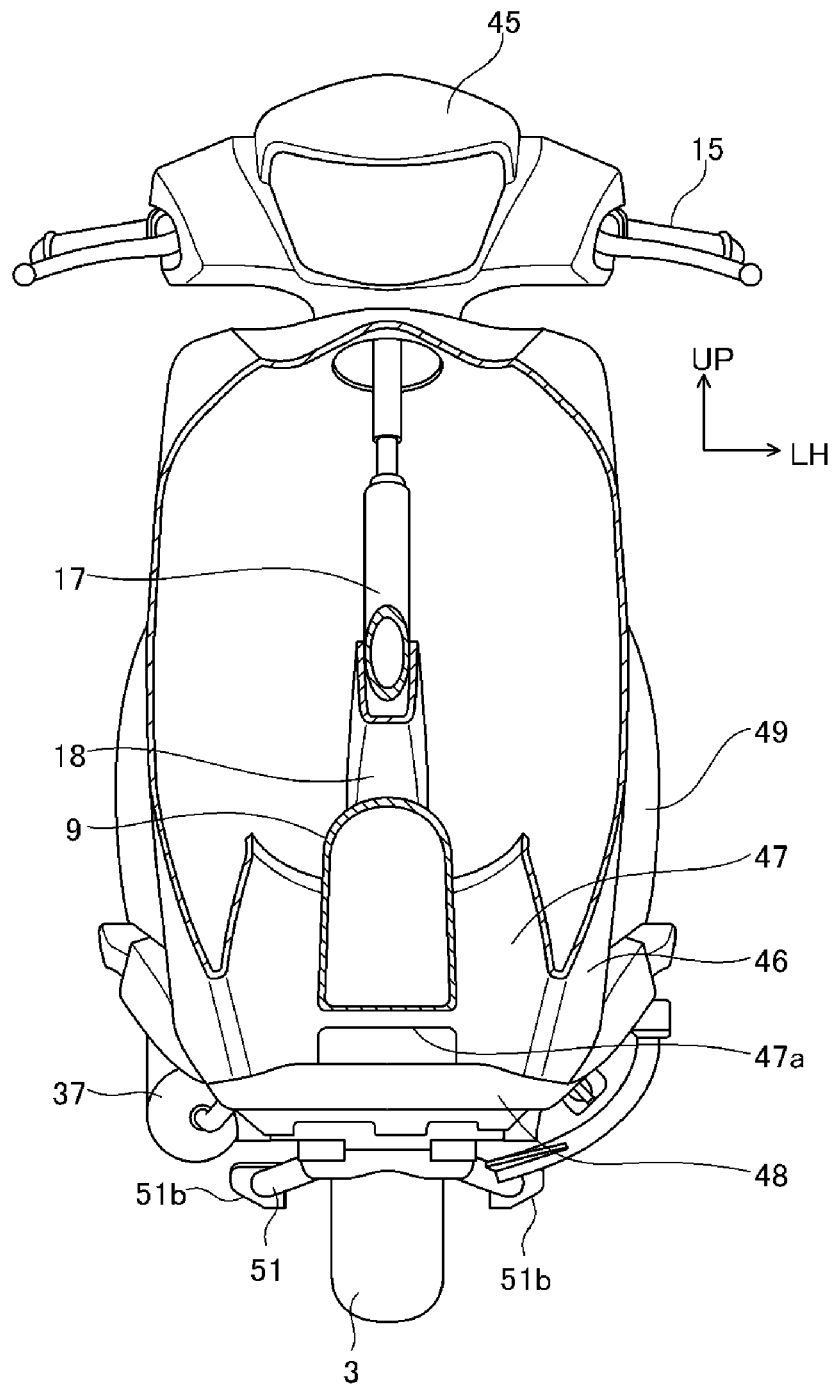
FIG. 9 is a sectional view taken along line IX-IX of FIG. 1.

FIG. 9 is a sectional view taken along line IX-IX of FIG. 1.

As depicted in FIG. 9, the leg shield 47 is formed in a lower end portion thereof with a front-side opening 47a that penetrates the leg shield 47 in the longitudinal vehicle direction. The leg shield 47 covers the legs of the rider seated on the seat 10 from the front side.

The front-side opening 47a is located on the rear side of the front wheel 2, and is located below a rear end of the front fender 9. The front-side opening 47a opens a space (FIG. 8) between the step floor 11 and the under cover 48 to the front side. The step floor 11 extends rearward up to such a position as to overlap with the front end of the unit swing engine 13 in side view. A rear end of the space between the step floor 11 and the under cover 48 is opening to the lower surface side of the cylinder section 35.

Part of the airflow induced by the traveling of the saddle riding vehicle 1 flows into the space between the step floor 11 and the under cover 48 via the front-side opening 47a, flows rearward passing through the space, and impinges on the catalyst device 140 on the lower side of the cylinder section 35. Therefore, the catalyst device 140 can be effectively cooled by the airflow flowing in via the front-side opening 47a.

As has been described above, according to the embodiment of the present invention, the saddle riding vehicle 1 includes: the body frame 12; the unit swing engine 13 that includes the cylinder section 35 disposed substantially horizontally and the crankcase 34 and that is swingably supported on the body frame 12 through the link member 38; the exhaust device 120 connected to the unit swing engine 13; and the catalyst device 140 disposed at an intermediate portion of the exhaust device 120. The link member 38 is disposed on the upper side of the unit swing engine 13. The catalyst device 140 is disposed below the cylinder section 35 and is located in the region between the imaginary line L1 that connects the pivot shaft 39 coupling the link member 38 to the body frame 12 and the front end 34a of the crankcase 34 and the imaginary line L2 that connects the exhaust pipe connection section 35e of the unit swing engine 13 connected with the end of the exhaust device 120 and the pivot shaft 39, in side view. The exhaust device coupling section 135 that couples the crankcase 34 and the exhaust device 120 is provided. As a result, the link member 38 is disposed on the upper side of the unit swing engine 13, whereby a space can be secured on the lower side of the unit swing engine 13, and the catalyst device 140 can be disposed utilizing this space. Further, since the catalyst device 140 is located in the region between the imaginary line L1 that connects the pivot shaft 39 and the front end 34a of the crankcase 34 and the imaginary line L2 that connects the exhaust pipe connection section 35e and the pivot shaft 39, the catalyst device 140 can be disposed in a compact fashion such that the catalyst device 140 do not come into contact with other peripheral parts. In addition, since the exhaust device coupling section 135 which couples the crankcase 34 and the exhaust device 120 is provided, it is ensured that even in the case where the exhaust pipe 121 and the catalyst device 140 are swung together with the unit swing engine 13, the catalyst can be supported stably against swinging of the unit swing engine 13.

The catalyst device 140 is disposed in such an orientation that its longitudinal direction is in the transverse direction, and the exhaust device coupling section 135 and the exhaust pipe connection section 35e that connects the exhaust pipe 121 and the cylinder section 35 are disposed in the manner of being allocated to left and right sides, with the longitudinal directional center line 140b of the catalyst device 140 as a reference, in bottom view. Therefore, the longitudinal directional center line 140b of the catalyst device 140 is located between the exhaust pipe connection section 35e that connects the cylinder section 35 and the exhaust pipe 121 and the exhaust device coupling section 135 that couples the exhaust device 120 to the crankcase 34, and, accordingly, the catalyst device 140 can be stably supported by the unit swing engine 13.

The exhaust device coupling section 135 includes the crankcase-side stay 136 and the exhaust-device-side stay 137 coupled to the crankcase-side stay 136. The crankcase-side stay 136 and the exhaust-device-side stay 137 are disposed such as to be offset in the transverse direction. The crankcase-side stay 136 and the exhaust-device-side stay 137 are coupled while overlapping with each other in the transverse direction. Therefore, support rigidity can be enhanced.

Since the exhaust-device-side stay 137 of the exhaust device coupling section 135 is provided on the catalyst device accommodating exhaust pipe 131 in which to accommodate the catalyst device 140, it is ensured that with the exhaust-device-side stay 137 provided for the catalyst device 140 which is large in weight, the catalyst device 140 can be supported stably.

The exhaust pipe 121 of the exhaust device 120 includes the vertical section 122g extending downward from the exhaust pipe connection section 35e of the cylinder section 35, the side extension section 122e that is continuous with the downstream side of the vertical section 122g and that extends toward one side with reference to the crankcase split surface CS, and the curved section 121a that is continuous with the side extension section 122e and that is turned back in a U shape. The crankcase-side stay 136 is provided on the other side with reference to the crankcase split surface CS. Therefore, even in the case where the exhaust pipe 121 extends while bypassing to one side with reference to the crankcase split surface CS and where the weight of the exhaust device 120 is increased, the structure in which the crankcase-side stay 136 is provided on the other side with reference to the crankcase split surface CS permits the catalyst device 140 to be supported stably on the unit swing engine 13.

In the present embodiment, the exhaust pipe 121 that guides the exhaust gas of the engine 30 and the catalyst device 140 disposed at an intermediate portion in the exhaust pipe 121 are provided. The exhaust pipe 121 has the catalyst device accommodating exhaust pipe 131 which accommodates the catalyst device 140. The catalyst device accommodating exhaust pipe 131 includes the catalyst case section 131b in which to accommodate the catalyst device 140 and the exhaust pipe section 131a provided to be integral with the catalyst case section 131b. The catalyst device accommodating exhaust pipe 131 is composed of the pair of the upper half 132 and the lower half 133 split along the exhaust gas flow direction, and has a structure in which the joint edge sections 132e of the upper half 132 and the joint edge sections 133e of the lower half 133 are mated with each other and are united with each other by welding. The catalyst case section 131b of the catalyst device accommodating exhaust pipe 131 includes the reduced diameter sections 132f and 133f that hold the catalyst device 140, and the joint edge sections 132e and 133e in the same section as the reduced diameter sections 132f and 133f in the case of cutting perpendicularly to the splitting direction of the catalyst device accommodating exhaust pipe 131 are made to be the enlarged diameter sections $132f_1$ and $133f_1$ larger than the outside diameter of the catalyst device 140. Therefore, with the catalyst device 140 held by the reduced diameter sections 132f and 133f of the catalyst device accommodating exhaust pipe 131, the catalyst device 140 can be held, without need to separately provide a holder or a packing for holding the catalyst device 140.

Further, the catalyst device accommodating exhaust pipe 131 that holds the catalyst device 140 is composed of the pair of the upper half 132 and the lower half 133 split along the exhaust gas flow direction, and the joint edge sections 132e and 133e in the same section as the reduced diameter sections 132f and 133f in the case of cutting perpendicularly to the splitting direction of the catalyst device accommodating exhaust pipe 131 are made to be the enlarged diameter sections $132f_1$ and $133f_1$ larger than the outside diameter of the outer shell section 141 of the catalyst device 140. According to this structure, it is unnecessary to provide a gap between the catalyst device 140 and the reduced diameter sections 132f and 133f holding the catalyst device 140 by interposing SUS wool or packing therebetween, so that it is possible to reduce the number of component parts and to hold the catalyst device 140 with a simple structure.

In addition, the catalyst device accommodating exhaust pipe 131 has a structure in which the joint edge sections 132*e* of the upper half 132 and the joint edge sections 133*e* of the lower half 133 are welded to each other, whereby the upper half 132 and the lower half 133 are united with each other. Further, the joint edge sections 132*e* and 133*e* in the same section as the reduced diameter sections 131*f*, 132*f* and 133*f* in the case of cutting perpendicularly to the splitting direction of the catalyst device accommodating exhaust pipe 131 are made to be the enlarged diameter sections 131*f*, 132*f*$_1$ and 133*f*$_1$ larger than the outside diameter of the outer shell section 141 of the catalyst device 140. According to this structure, the joint edge sections 132*e* and 133*e* of the upper half 132 and the lower half 133 can be welded to each other, while holding the catalyst device 140 by the reduced diameter sections 131*f*, 132*f*, and 133*f* and while preventing contact between the outer shell section 141 of the catalyst device 140 and the joint edge sections 132*e*, 133*e* of the catalyst case sections 132*b* and 133*b*. Accordingly, the catalyst device 140 can be prevented from being fused to the joint edge sections 132*e* and 133*e*.

Further, the catalyst device 140 includes the tubular outer shell section 141 serving as an outer shell, and the catalyst 142 accommodated in the inside of the outer shell section 141. The enlarged diameter sections 131*f*$_1$, 132*f*$_1$ and 133*f*$_1$ of the joint edge sections 132*e* and 133*e* in the same section as the reduced diameter sections 131*f*, 132*f* and 133*f* are spaced from the outer shell section 141 by the gap 146 provided therebetween. Besides, the reduced diameter sections 131*f*, 132*f* and 133*f* are in contact with the outer shell section 141. Therefore, the outer shell section 141 of the catalyst device 140 can be held by the reduced diameter sections 131*f*, 132*f* and 133*f* of the upper half 132 and the lower half 133; in addition, at the time of welding, the outer shell section 141 of the catalyst device 140 can be prevented from being fused to the joint edge sections 132*e* and 133*e*.

Besides, the catalyst case section 131*b* has case sections 131*g*, 132*g* and 133*g* which are larger in diameter than the outer shell section 141 of the catalyst device 140, and which are spaced from the outer shell section 141 by the gap 145 provided therebetween. Therefore, even in the case where the catalyst 142 is brought to a high temperature, the heat of the catalyst 142 is not liable to be transmitted to the catalyst device accommodating exhaust pipe 131.

The reduced diameter sections 132*f* and 133*f* of the catalyst device accommodating exhaust pipe 131 are provided on the upstream side of the catalyst device 140 in regard to the exhaust gas flow direction. This structure ensures that the upstream-side holding section 141*a* on the upstream side of the outer shell section 141 of the catalyst device 140 can be held by the reduced diameter sections 132*f* and 133*f*, whereby a packing or a holding member can be abolished.

Further, in the present embodiment, the upstream-side exhaust pipe 122 and the exhaust pipe section 131*a* of the catalyst device exhaust pipe 130 have the curved section 122*f* and the exhaust pipe curved section 131*a*$_1$. The catalyst 142 is disposed on the downstream side of the upstream-side exhaust pipe exhaust pipe curved section 131*a*$_1$. The center axis X of the catalyst 142 is offset to the curving directionally outer side (O in FIGS. 20 and 21) with reference to the center axis Y of the exhaust pipe curved section 131*a*1 of the exhaust pipe section 131*a*. The diffusion member 209 is disposed on the curving directionally outer side (O in FIGS. 20 and 21) with reference to the center axis Y of the exhaust pipe section 131*a* and on the upstream side of the catalyst 142. This structure ensures that the exhaust gas is liable to impinge on the catalyst 142 which is disposed on the curving directionally inner side and downstream of the exhaust pipe curved section 131*a*$_1$ of the exhaust pipe section 131*a* and at a part where the exhaust gas hardly impinges. In addition, the diffusion member 209 can be easily disposed in conformity with the space on the upstream side of the catalyst 142 connected to the exhaust pipe section 131*a*, or with the connection section 131*h*, so that an exhaust gas diffusing effect can be enhanced for the catalyst 142.

Therefore, the exhaust gas can be effectively clarified, the exhaust gas can be prevented from flowing toward the curving directionally outer side in a partialized manner, and the exhaust gas can be made to uniformly impinge on the catalyst 142.

In addition, the diffusion member 209 has the straightening vane 209*a* that is inclined at the acute angle θ relative to the center axis Y of the downstream end 131*a*$_2$ of the exhaust pipe curved section 131*a*$_1$ of the exhaust pipe section 131*a* and is oriented toward the curving directionally inner side in the manner of opposing to the flow of the exhaust gas. Therefore, the exhaust gas flow direction can be changed while restraining flow resistance, and the exhaust gas can be easily made to impinge on the whole part of the catalyst 142.

Besides, the straightening vane 209*a* is provided with the communication openings 290 providing communication between the upstream side and the downstream side in regard to the exhaust gas flow. Specifically, the communication openings 290 are provided in the straightening vane 209*a* that is inclined at the acute angle θ relative to the center axis Y of the downstream end 131*a*$_2$ of the exhaust pipe curved section 131*a*$_1$ of the exhaust pipe section 131*a* and that opposes the exhaust gas flow. As a result, the exhaust gas can be divided into the exhaust gas that passes through the communication openings 290 and flows in a direction guided from the exhaust pipe section 131*a* and the exhaust gas changed in flow direction by the straightening vane 209*a*. Therefore, the exhaust gas can be effectively diffused, and the exhaust gas can be exposed to the whole part of the catalyst 142, whereby efficient clarification can be achieved.

In addition, the catalyst device accommodating exhaust pipe 131 with the catalyst 142 accommodated therein is connected to the downstream side of the exhaust pipe curved section 131*a*$_1$. The catalyst device accommodating exhaust pipe 131 includes the connection section 131*h* enlarged in diameter along the exhaust gas flow direction, on the upstream side of the catalyst 142, and the diffusion member 209 is disposed inside the connection section 131*h*. Therefore, the catalyst 142 and the diffusion member 209 in the connection section 131*h* are favorably disposed inside the catalyst case 7, and the exhaust device 120 of the saddle riding vehicle 1 is configured efficiently in a compact fashion.

The diffusion member 209 has the outer peripheral edge section 209*c* formed to be along an inner peripheral surface 131*h*$_3$ of the connection section 131*h* of the catalyst device accommodating exhaust pipe 131 by turning back an upstream-side peripheral edge 209*b* of the straightening vane 209*a* in an outer peripheral side downstream direction, and the outer peripheral edge section 209*c* is attached to the connection section 131*h*. Therefore, the diffusion member 209 can be simply and easily attached at a favorable position in this structure.

Besides, in bottom view, the body frame 12 includes the enlarged width sections 21*a* the gap between which is enlarged in the transverse direction in going rearward, and the catalyst device 140 is disposed on the transverse directionally inner side as compared to the transverse directionally outer end portions 21b of the enlarged width sections 21a. Therefore, the catalyst device 140 can be protected from the transverse directionally outer sides by the enlarged width sections 21a. In addition, the catalyst device 140 with heavy weight can be disposed on the transverse directionally central side, so that mass centralization in the transverse direction can be realized. Besides, the center stand 51 for supporting the saddle riding vehicle 1 in an upright state is provided, and the catalyst device 140 is disposed above the lower ends 51b of the center stand 51. Therefore, the catalyst device 140 can be disposed on the lower side of the cylinder section 35 and above the lower ends 51b of the center stand 51, so that the catalyst device 140 can be disposed at a position which is high with reference to the road surface.

Further, the side stand 52 is attached to the body frame 12, and, in a state in which the side stand 52 is stored, the side stand 52 and at least part of the catalyst device 140 overlap with each other in side view. Therefore, the catalyst device 140 can be protected from a lateral side by the side stand 52, and the catalyst device 140 can be made to be hard to visually recognize by the side stand 52, whereby external appearance can be enhanced.

In addition, the shroud 56 for air cooling is attached to the unit swing engine 13. The cylinder cover 58 of the shroud 56 is inclined such as to be located on the upper side in going from a position on the rear side of the catalyst device 140 toward the catalyst device 140, and includes the relief section 58b at a position for facing the catalyst device 140. As a result, by the relief section 58b of the shroud 56, the distance between the catalyst device 140 and the shroud 56 can be secured, and the heat of the catalyst device 140 can be restrained from influencing the shroud 56.

Besides, the cooling fan 55 is attached to the crankshaft 33 accommodated in the crankcase 34, and the shroud 56 includes the air guide port 88 for guiding the cooling air of the cooling fan 55 to the catalyst device 140. Therefore, the cooling air of the cooling fan 55 can be guided through the air guide port 88 to the catalyst device 140, whereby the catalyst device 140 can be cooled.

In addition, the rider's seat 10 is disposed on the upper side of the unit swing engine 13, the center lower cover 50 is disposed on the lower side of the front end of the seat 10, the center lower cover 50 is provided with the lower opening 87 below the uppermost end of the unit swing engine 13, and the lower opening 87 is disposed in the state of being inclined obliquely downward such as to be oriented toward the catalyst device 140. This structure ensures that the airflow can be guided from the lower opening 87 of the center lower cover 50 to the catalyst device 140, and the catalyst device 140 can be cooled utilizing the airflow.

Besides, the step floor 11 is disposed on the front side of the unit swing engine 13, the leg shield 47 is disposed on the front side of the step floor 11, and the leg shield 47 is provided with the front-side opening 47a for guiding air to the catalyst device 140. As a result, airflow can be guided through the front-side opening 47a of the leg shield 47 to the catalyst device 140, so that the catalyst device 140 can be cooled utilizing the airflow.

In addition, the catalyst device 140 is disposed with its longitudinal direction in the transverse direction, the body frame 12 has the pair of left and right lower frames 19, the cross member 23 connecting the lower frames 19 in the transverse direction is provided, and the cross member 23 overlaps with at least part of the catalyst device 140 in front view. As a result, the catalyst device 140 can be protected from the front side by the cross member 23. Further, the catalyst device 140 is disposed with its longitudinal direction in the transverse direction, and the longitudinal directional center line 140b in the transverse direction of the catalyst device 140 is offset to transverse directionally one side (one side) as compared to the imaginary line C passing through the crankcase split surface CS of the saddle riding vehicle 1. Therefore, the pipe length of the upstream-side exhaust pipe 122 on the upstream side of the catalyst device 140 can be secured to be long.

Besides, the muffler 37 connected with the rear end of the exhaust device 120 is provided on transverse directionally one side, the exhaust pipe connection section 35e is provided at a lower surface of the cylinder section 35, the catalyst device 140 is disposed on the rear side of the exhaust pipe connection section 35e and on the front side of the front end 34a of the crankcase 34, with its longitudinal direction in the transverse direction, and the exhaust device 120 includes the upstream-side exhaust pipe 122 that extends toward the lower side and the transverse directionally other side on the front side of the catalyst device 140 from the exhaust pipe connection section 35e, is then turned back to transverse directionally one side and is connected to the transverse directionally other side end of the catalyst device 140, and the downstream-side exhaust pipe 123 that extends rearward from transverse directionally one side end of the catalyst device 140 and is connected to the muffler 37. This structure in which the upstream-side exhaust pipe 122 extending from the lower surface of the cylinder section 35 is extended toward the side opposite to the muffler 37, is then turned back and is connected to the other end of the catalyst device 140, ensures that the length of the upstream-side exhaust pipe 122 can be secured to be long. Further, the catalyst device 140 can be disposed in a compact fashion by utilizing the space between the upstream-side exhaust pipe 122 and the front end 34a of the crankcase 34.

While the embodiment of the present invention has been described above, the present invention is not limited to the above embodiment, and various design modifications are possible without departing from the scope of the gist thereof. Naturally, the scope of the gist of the present invention includes those in which the saddle riding vehicle, the internal combustion engine and the like are carried out in a variety of modes.

Note that while parts of left-right layout in the embodiment illustrated have been described above for convenience of explanation, those different on the left and right sides are also included in the present invention insofar as they are within the scope of the gist of the present invention.

REFERENCE SIGNS LIST

1: Saddle riding vehicle, 2: Body frame, 10: Seat, 11: Step floor, 12: Body frame, 13: Unit swing engine, 19: Lower frame (Frame), 21a: Enlarged width section, 21b: Transverse directionally outer end portion, 23: Cross member, 30: Engine, 33: Crankshaft, 34: Crankcase, 34a: Front end, 35: Cylinder section, 35e: Exhaust pipe connection section, 37: Muffler, 38: Link member, 39: Pivot shaft (Coupling section), 47: Leg shield, 47a: Front-side opening, 50: Center lower cover, 51: Center stand, 51b: Lower end, 52: Side stand, 55: Cooling fan, 56: Shroud, 57: Fan cover, 58b: Relief Section, 61: Link member coupling section, 120: Exhaust pipe, 121: Exhaust pipe, 121a: Curved section, 122e: Side extension section, 122g: Vertical section, 131: Catalyst device accommodating exhaust pipe, $131a_1$: Exhaust pipe curved section, 131b: Catalyst case section, 131f: Reduced diameter section, $131f_1$: Enlarged diameter sections, 131h: Connection section, $131h_1$: Inner periphery upper portion, $131h_2$: Inner periphery lower portion, $131h_3$: Inner peripheral surface, 132: Upper half, 132e: Joint edge section, 132f: Reduced diameter section, $132f_1$: Enlarged width section, 133: Lower half, 133e: Joint edge section, 133f: Reduced diameter section, $133f_1$: Enlarged diameter section, 135: Exhaust device coupling section, 136: Crankcase-side stay, 137: Exhaust-device-side stay, 140: Catalyst device, 140b: Longitudinal directional center line, 141: Outer shell section, 141a: Upstream end, 141b: Downstream end, 145: Gap, 146: Gap, 209: Diffusion member, 290: Communication opening, CS: Crankcase split surface, C: Imaginary line passing through crankcase split surface CS, CX: Center axis (of catalyst case section 131b, outer shell section 141, and catalyst 142), Y: Center axis (of exhaust pipe curved section $131a_1$).

The invention claimed is:

1. A saddle riding vehicle comprising:
a body frame;
a unit swing engine having a cylinder section disposed substantially horizontally and a crankcase, the unit swing engine being swingably supported on the body frame through a link member; and
an exhaust device connected to the unit swing engine and including an exhaust pipe and a catalyst device disposed at an intermediate portion of the exhaust pipe,
wherein the exhaust pipe extends downward from the unit swing engine,
the exhaust pipe includes a catalyst device accommodating exhaust pipe accommodating the catalyst device therein, an upstream-side exhaust pipe disposed on an upstream side of the catalyst device accommodating exhaust pipe, and a downstream-side exhaust pipe disposed on a downstream side of the catalyst device accommodating exhaust pipe,
the catalyst device is larger in diameter than a diameter of the upstream-side exhaust pipe and than a diameter of the downstream-side exhaust pipe,
the link member is disposed on an upper side of the crankcase,
in side view, at least part of the catalyst device is disposed below the cylinder section and is located in a region between
an imaginary line connecting a link member coupling section for coupling the link member to the body frame and a front end of the crankcase and
an imaginary line connecting an exhaust pipe connection section of the unit swing engine connected with an end of the exhaust pipe and the link member coupling section, and
an exhaust device coupling section for coupling the crankcase and the exhaust device is provided.

2. The saddle riding vehicle as claimed in claim 1,
wherein the catalyst device is disposed in such a direction that a longitudinal direction of the catalyst device is oriented in a transverse direction, and
the exhaust device coupling section and the exhaust pipe connection section connecting the exhaust pipe and the cylinder section are disposed in a manner of being allocated to left and right sides, with respect to a longitudinal directional center line of the catalyst device as viewed from a bottom.

3. The saddle riding vehicle as claimed in claim 2,
wherein the exhaust device coupling section has a crankcase-side stay and an exhaust-device-side stay coupled to the crankcase-side stay,
the crankcase-side stay and the exhaust-device-side stay are disposed with an offset in the transverse direction, and
the crankcase-side stay and the exhaust-device-side stay are coupled with each other while being overlapped with each other in the transverse direction.

4. The saddle riding vehicle as claimed in claim 1,
wherein the exhaust device coupling section has a crankcase-side stay and an exhaust-device-side stay coupled to the crankcase-side stay,
the crankcase-side stay and the exhaust-device-side stay are disposed with an offset in the transverse direction, and
the crankcase-side stay and the exhaust-device-side stay are coupled with each other while being overlapped with each other in the transverse direction.

5. The saddle riding vehicle as claimed in claim 4,
wherein the crankcase is split at a crankcase split surface into left and right portions,
the exhaust pipe of the exhaust device has a vertical section extending downward from the exhaust pipe connection section of the cylinder section, a side extension section being continuous to a downstream side of the vertical section and extending toward one side with respect to an imaginary line passing through the crankcase split surface of the crankcase as viewed from a bottom, and a curved section being continuous with the side extension section and turning back in a U shape, and
the crankcase-side stay is provided on the other side with respect to the imaginary line passing through the crankcase split surface as viewed from a bottom.

6. The saddle riding vehicle as claimed in claim 4,
wherein the exhaust-device-side stay of the exhaust device coupling section is provided on a catalyst device accommodating exhaust pipe accommodating the catalyst device.

7. The saddle riding vehicle as claimed in claim 6,
wherein the crankcase is split at a crankcase split surface into left and right portions,
the exhaust pipe of the exhaust device has a vertical section extending downward from the exhaust pipe connection section of the cylinder section, a side extension section being continuous to a downstream side of the vertical section and extending toward one side with respect to an imaginary line passing through the crankcase split surface of the crankcase as viewed from a bottom, and a curved section being continuous with the side extension section and turning back in a U shape, and
the crankcase-side stay is provided on the other side with respect to the imaginary line passing through the crankcase split surface as viewed from a bottom.

8. The saddle riding vehicle as claimed in claim 1, wherein
the exhaust pipe guides an exhaust gas of the unit swing engine; and
the catalyst device accommodating exhaust pipe has a catalyst case section accommodating the catalyst device,
the catalyst device accommodating exhaust pipe has a structure having a first half and a second half split along an exhaust gas flow direction wherein joint edge sections of the first half and the second half are mated and united with each other, the catalyst case section of the catalyst device accommodating exhaust pipe includes reduced diameter sections holding the catalyst device, and the joint edge sections in the same section as the reduced diameter sections in a case of cutting perpendicularly to a splitting direction of the catalyst device accommodating exhaust pipe are made to be enlarged diameter sections larger than an outside diameter of the catalyst device.

9. The saddle riding vehicle as claimed in claim 8, wherein the reduced diameter sections are provided on an upstream side in regard to an exhaust gas flow direction of the catalyst device and hold the catalyst device.

10. The saddle riding vehicle as claimed in claim 8,
wherein the catalyst device includes a tubular outer shell section serving as an outer shell, and a catalyst accommodated in the outer shell section, and the enlarged diameter sections are provided with a gap between the enlarged diameter sections and the outer shell section, and the reduced diameter sections are put in contact with the outer shell section.

11. The saddle riding vehicle as claimed in claim 10,
wherein the catalyst case section includes case sections larger in diameter than the outer shell section, and the case sections are provided with a gap between the case sections and the outer shell section.

12. The saddle riding vehicle as claimed in claim 8, wherein the catalyst device accommodating exhaust pipe has the structure wherein the first half and the second half are united with each other by welding the joint edge sections of the first half and the second half.

13. The saddle riding vehicle as claimed in claim 12,
wherein the catalyst device includes a tubular outer shell section serving as an outer shell, and a catalyst accommodated in the outer shell section, and the enlarged diameter sections are provided with a gap between the enlarged diameter sections and the outer shell section, and the reduced diameter sections are put in contact with the outer shell section.

14. The saddle riding vehicle as claimed in claim 12, wherein the reduced diameter sections are provided on an upstream side in regard to an exhaust gas flow direction of the catalyst device and hold the catalyst device.

15. The saddle riding vehicle as claimed in claim 1, wherein the exhaust pipe has a curved section;

the catalyst device includes a catalyst disposed in the exhaust pipe on a downstream side of the curved section of the exhaust pipe, a center axis of the catalyst is offset toward a curving directionally outer side with respect to a center axis of the curved section of the exhaust pipe, and a diffusion member is disposed on a curving directionally outer side with respect to the center axis of the exhaust pipe and on an upstream side of the catalyst.

16. The saddle riding vehicle as claimed in claim 15, wherein the diffusion member has a straightening vane inclining at an acute angle in relation to the center axis of a downstream end of the curved section of the exhaust pipe, faces a flow of an exhaust gas, and is oriented toward a curving directionally inner side with respect to the center axis of the exhaust pipe.

17. The saddle riding vehicle as claimed in claim 16, wherein the straightening vane has a communication opening through which an upstream side and a downstream side of an exhaust gas flow communicate with each other.

18. The saddle riding vehicle as claimed in claim 17, wherein the catalyst device accommodating exhaust pipe with the catalyst accommodated therein is connected to a downstream side of the curved section, the catalyst device accommodating exhaust pipe has a connection section enlarged in diameter along an exhaust gas flow direction on an upstream side of the catalyst, and the diffusion member is disposed inside the connection section.

19. The saddle riding vehicle as claimed in claim 16,
wherein the catalyst device accommodating exhaust pipe with the catalyst accommodated therein is connected to a downstream side of the curved section, the catalyst device accommodating exhaust pipe has a connection section enlarged in diameter along an exhaust gas flow direction on an upstream side of the catalyst, and the diffusion member is disposed inside the connection section.

20. The saddle riding vehicle having as claimed in claim 19, wherein the diffusion member has an outer peripheral edge section formed to be along an inner peripheral surface of the connection section of the catalyst device accommodating exhaust pipe by turning back an upstream-side peripheral edge of the straightening vane in an outer peripheral side downstream direction, and the outer peripheral edge section is attached to the connection section.

* * * * *